(12) United States Patent
Murray

(10) Patent No.: US 9,183,288 B2
(45) Date of Patent: Nov. 10, 2015

(54) SYSTEM AND METHOD OF STRUCTURING DATA FOR SEARCH USING LATENT SEMANTIC ANALYSIS TECHNIQUES

(75) Inventor: Jonathan Murray, Berthoud, CO (US)

(73) Assignee: Kinetx, Inc., Tempe, AZ (US)

( * ) Notice: Subject to any disclaimer, the term of this patent is extended or adjusted under 35 U.S.C. 154(b) by 898 days.

(21) Appl. No.: 13/015,372

(22) Filed: Jan. 27, 2011

(65) Prior Publication Data

US 2011/0225159 A1 Sep. 15, 2011

Related U.S. Application Data

(60) Provisional application No. 61/298,684, filed on Jan. 27, 2010.

(51) Int. Cl.
*G06F 17/30* (2006.01)

(52) U.S. Cl.
CPC .................. *G06F 17/30713* (2013.01)

(58) Field of Classification Search
CPC ................................................ G06F 17/30713
USPC ........................................................ 707/739
See application file for complete search history.

(56) References Cited

U.S. PATENT DOCUMENTS

| | | | |
|---|---|---|---|
| 4,839,853 A | 6/1989 | Deerwester et al. | |
| 6,954,750 B2 | 10/2005 | Bradford | |
| 7,024,407 B2 | 4/2006 | Bradford | |
| 7,113,943 B2 | 9/2006 | Bradford et al. | |
| 7,415,462 B2 | 8/2008 | Bradford | |
| 7,447,665 B2 | 11/2008 | Murray | |
| 7,720,792 B2 | 5/2010 | Price | |
| 2006/0117052 A1* | 6/2006 | Bradford | 707/101 |
| 2006/0122979 A1* | 6/2006 | Kapur et al. | 707/3 |
| 2006/0224572 A1 | 10/2006 | Price | |
| 2006/0224584 A1 | 10/2006 | Price | |
| 2006/0235661 A1 | 10/2006 | Price | |
| 2006/0242098 A1 | 10/2006 | Wnek | |
| 2006/0242140 A1 | 10/2006 | Wnek | |
| 2006/0242190 A1 | 10/2006 | Wnek | |
| 2006/0265209 A1 | 11/2006 | Bradford | |
| 2006/0265362 A1 | 11/2006 | Bradford | |
| 2006/0294101 A1 | 12/2006 | Wnek | |
| 2009/0328226 A1 | 12/2009 | Bradford | |

OTHER PUBLICATIONS

Berry & Browne; "Understanding Search Engines"; 2005; pp. 11-27, 29-43, 45-61, 63-69, 71-76; Second Edition; SIAM: Society for Industrial and Applied Mathematics; Philadelphia.

Kohonen; "Self-Organizing Maps"; 2001; pp. 105-127, 161-176; Third Edition; Springer-Verlag; Germany.

(Continued)

*Primary Examiner* — Tony Mahmoudi
*Assistant Examiner* — Mohammad Rahman
(74) *Attorney, Agent, or Firm* — Snell & Wilmer LLP

(57) ABSTRACT

The disclosed embodiments provide a system and method for using modified Latent Semantic Analysis techniques to structure data for efficient search and display. The present invention creates a hierarchy of clustered documents, representing the topics of a domain corpus, through a process of optimal agglomerative clustering. The output from a search query is displayed in a fisheye view corresponding to the hierarchy of clustered documents. The fisheye view may link to a two-dimensional self-organizing map that represents semantic relationships between documents.

23 Claims, 24 Drawing Sheets

(56) References Cited

OTHER PUBLICATIONS

Landauer et al.; "Handbook of Latent Semantic Analysis"; 2007; pp. 3-55; First Edition; Lawrence Erlbaum Associates; Mahwah, New Jersey.

Landauer et al.; "An Introduction to Latent Semantic Analysis"; pp. 1-41; published in Discourse Processes, vol. 25, 1998, pp. 259-284.

Deerwester et al.; "Indexing by Latent Semantic Analysis"; pp. 1-30; published in Journal of the Society for Information Science, vol. 41(6), 1990, pp. 391-407.

Guthikonda; "Kohonen Self-Organizing Maps"; 2005; pp. 1-19; available at http://www.shy.am/wp-content/uploads/2009/01/kohonen-self-organizing-maps-shyam-guthikonda.pdf.

Foltz; "Using Latent Semantic Indexing for Information Filtering"; pp. 1-10; published in Proceedings of the Conference on Office Information Systems, 1990, Cambridge, MA, pp. 40-47.

Wikipedia: Latent Semantic Indexing; website: http://en.wikipedia.org/wiki/Latent_semantic_indexing; accessed Dec. 29, 2010; 9 pages.

Wikipedia: Singular Value Decomposition; website: http://en.wikipedia.org/wiki/Singular_value_decomposition; accessed Dec. 29, 2010; 18 pages.

Wikipedia: Text Mining; website: http://en.wikipedia.org/wiki/Text_Mining; accessed Jan. 13, 2011; 6 pages.

Pearson's Knowledge Technologies Products—SuperManual; website: http://www.pearsonkt.com/prodSM.shtml; accessed Apr. 26, 2011; 7 pages.

Text to Matrix Generator (TMG); website: http://scgroup20.ceid.upatras.gr:8000/tmg/; accessed Apr. 26, 2011; 20 pages.

WestlawNext Brochure; "Exclusive West Content and WestSearch technology provide superior results"; available at http://west.thomson.com/documentation/westlaw/wlawdoc/web/WestlawNext_Search_Brochure.pdf; accessed Apr. 26, 2011; Copyright year 2010; 4 pages.

Content Analyst: "Using Example to Conceptually Categorize Documents Automatically," website: http://www.contentanalyst.com/html/tech/technologies_categorization.html; accessed Jan. 13, 2011; Copyright year 2007; 1 page.

Content Analyst: "Dynamic Clustering Automatically Groups Conceptually-Similar Documents," website: http://www.contentanalyst.com/html/tech/technologies_clustering.html; accessed Jan. 13, 2011; Copyright year 2007; 1 page.

Content Analyst: "CAAT uses LSI for Powerful, Mathematics-Based Text Analytics"; website: http://www.contentanalyst.com/html/tech/technologies_lsi.html; accessed Jan. 13, 2011; Copyright year 2007; 1 page.

Content Analyst: "Document Categorization Using Latent Semantic Indexing"; http://www.contentanalyst.com/images/images/Categorization_LSI.pdf; 4 pages; Published in: Proceedings, Symposium on Document Image Understanding Technologies, Greenbelt, Maryland, Apr. 2003.

Content Analyst: "Why LSI? Latent Semantic Indexing and Information Retrieval"; http://www.contentanalyst.com/images/images/overview_lsi_v1.pdf; accessed Jan. 13, 2011; 3 pages.

* cited by examiner

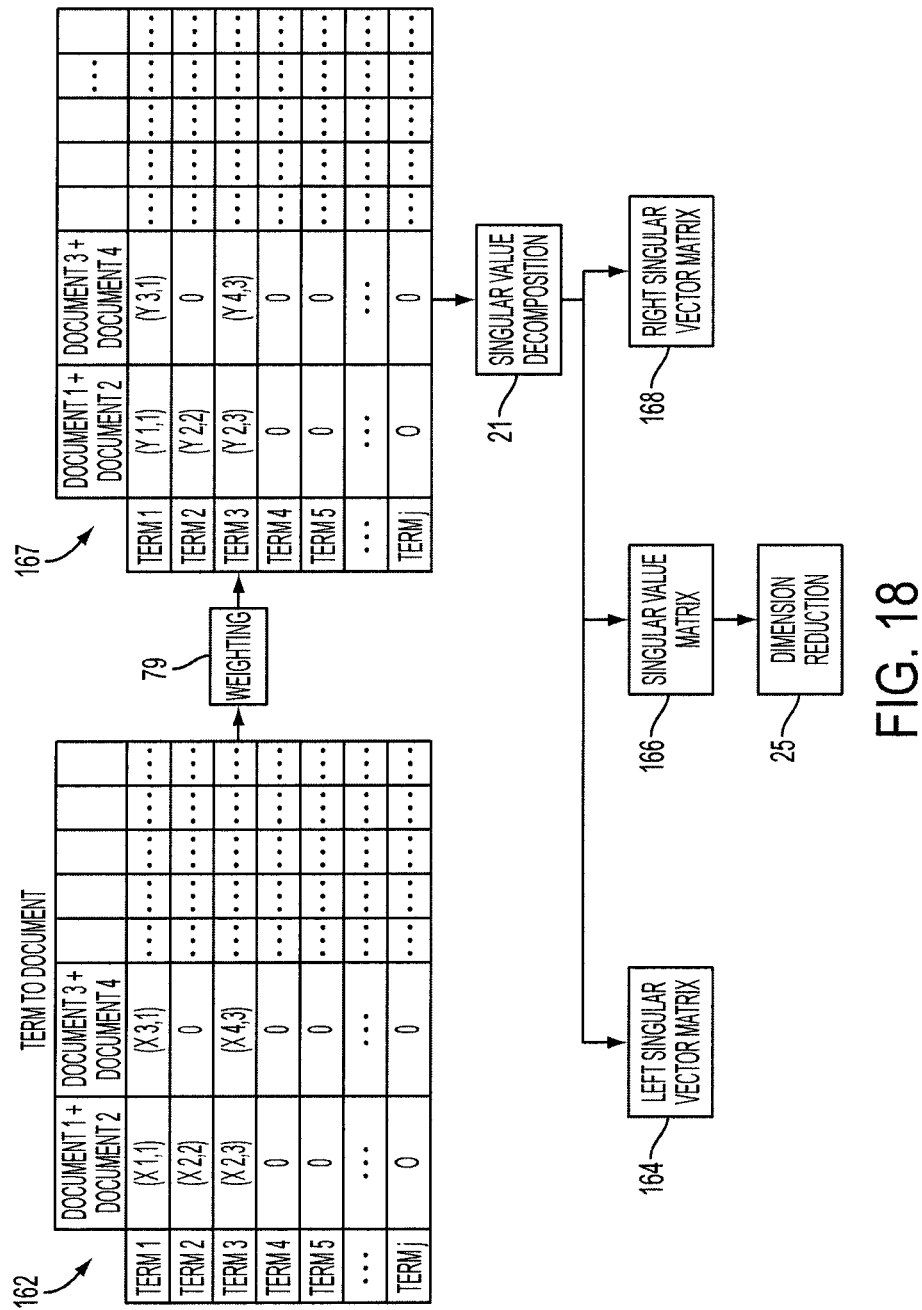

SYSTEM AND METHOD OF STRUCTURING DATA FOR SEARCH USING LATENT SEMANTIC ANALYSIS TECHNIQUES

RELATED APPLICATIONS

This application claims priority to and the benefit of U.S. Provisional Patent Application No. 61/298,684, entitled "SYSTEM AND METHOD OF STRUCTURING DATA FOR SEARCH" filed on Jan. 27, 2010, the entire disclosure of which is incorporated herein by reference.

FIELD OF THE INVENTION

The disclosure generally relates to a system and method of structuring data for search, and for ascertaining the semantic relationships between documents. Specifically, the disclosed embodiments use modified Latent Semantic Analysis techniques to create a hierarchal structure of information a user may query to efficiently retrieve relevant search results, and to make new semantic connections between documents.

DESCRIPTION OF RELATED ART

Conventional search methods utilize a series of key words or terms matched against a known corpus of information. A user inputs a query word or phrase and a search engine matches the word or phrase against a listing of words derived from a corpus. The search engine then displays the sources that correspond to the particular query word or phrase. However, the conventional search methods fail to account for two primary problems inherent in searching.

The first problem is an imprecise search. In an imprecise search, a user inputs incorrect information into the query. If the user does not input the correct words into the query, then the sources retrieved will not represent the user's intent. For example, if a user inputs a particular search word into a query, but the desired information is indexed under a synonym of the search word, then the user will not retrieve the desired information.

The second problem is a vague search. In vague search, the user does not know enough about the subject matter of the desired information to form a precise search query. For example, if the user does not know the particular technical language used to describe a particular medical condition, then the user will not be able to properly input the correct language into the search query.

Previous efforts have been made to address the imprecision and vagueness problems inherent in conventional search methods. Latent Semantic Analysis techniques, described in U.S. Pat. No. 4,839,853, and detailed in *Understanding Search Engines* by Michael W. Berry and Murray Browne, the entireties of which are incorporated by this specific reference, seek to address these issues. Latent Semantic Analysis allows a user to search underlying concepts inherent within the text of a document. Using Latent Semantic Analysis techniques, a computer algorithm divides a text into a vector space model that captures broad concepts in the text. A user can then search the vector space model and match a search query with the concepts expressed in the text. Thus, the imprecise and vague search problems are avoided. If the user inputs an imprecise search, Latent Semantic Analysis will recover synonyms for the inputted terms. If the user inputs a vague search, Latent Semantic Analysis will recover the underlying concepts expressed in the desired field of search.

Yet, traditional Latent Semantic Analysis methods fail to provide a method for a user to efficiently search a large domain corpus and visualize the output from a search query. Latent Semantic Analysis may document the underlying concepts behind a text, yet a user still must find a way to effectively review the retrieved data. A program titled the "Super-Manual" uses Latent Semantic Analysis techniques to display information by providing links to retrieved documents. The retrieved documents are weighted based on how well the document's meaning matches that of a query. Moreover, a program titled a "Term to Matrix Generator" uses Latent Semantic Analysis techniques to divide a text corpus into increasingly smaller sets of documents using a "top-down" approach that divides the entire corpus successively.

However, no existing approach offers an effective method of structuring data using Latent Semantic Analysis techniques that both obtains more reliable results and outputs the search results in an organized and coherent manner.

Further, no existing approach offers an effective method that allows users to "mine" texts, to make new semantic connections between texts, and to visualize these connections between the texts in an efficient manner.

SUMMARY

The present invention, titled "knowledgePOOL" or "kPOOL," and, will be referred to equivalently throughout this document as "kPOOL," presents an effective method of structuring data for efficient and reliable searching, and of "mining" semantic relationships between documents. In one aspect of the present disclosure, kPOOL uses modified Latent Semantic Analysis techniques to create a vector space model of documents contained within a domain corpus. kPOOL then creates a hierarchal structure of the documents through a process of optimal agglomerative clustering. Each document within a domain corpus is matched with the other documents in the same domain corpus to determine which documents are most similar. kPOOL matches the document nodes, or the vector representations of the documents, with one another. The most similar document nodes are grouped together to form pairs and clusters. kPOOL then matches the most similar document node clusters and creates a larger grouping of document clusters. kPOOL continues to cluster the nodes iteratively until a structure is formed resembling a tree. The structure represents a hierarchy of clustered documents of the domain corpus. A user may then search through the domain corpus to retrieve not only a relevant document, but also the underlying topics related to that relevant document. The user can determine if other topics are relevant to the search query, and can search other documents within those topics. In this manner, a user may quickly search through varied concepts to efficiently find the most relevant topical information.

kPOOL presents results in a GUI fisheye view that displays the topics related to relevant documents. A user can quickly visualize in the fisheye view which topics are most closely related to the search query. Thus, a user may effectively determine if the search query has produced inaccurate results and may modify a search accordingly. The user may find relevant topics and resubmit them to the query in a process of cognitive acceleration.

kPOOL also utilizes self-organizing maps, as described in *Self-Organizing Maps* by Teuvo Kohonen, the entirety of which is incorporated herein by this specific reference. In one embodiment, the self-organizing maps display a two-dimensional representation of the semantic connections between documents. Further, the user may utilize a filtering, or masking technique, to uncover underlying semantic connections between documents. The self-organizing maps allow a user to visualize the semantic similarities and differences between documents within a domain corpus. The user may then "mine" texts to make semantic connections between documents.

In one embodiment, the self-organizing maps display the differences between topics associated with particular documents. A user may use the maps to assess and navigate through the hierarchy of clustered documents and retrieve relevant documents.

In one embodiment, kPOOL utilizes a web book that allows a user to quickly scan text within a corpus and find associated text within the same corpus or another corpus.

In one embodiment, kPOOL utilizes a federated semantic mart that allows a user to search across multiple corpuses for relevant information.

In one embodiment, kPOOL is implemented in conjunction with a cross domain solution.

In one embodiment, kPOOL is implemented in combination with a security event manager.

In one embodiment, kPOOL is used for intelligence mining purposes.

BRIEF DESCRIPTION OF THE DRAWINGS

The exact nature of this invention as well as other objects and advantages thereof will be readily apparent from consideration of the following specification in conjunction with the accompanying drawings in which like numerals designate like parts through the figures thereof and wherein:

FIG. 18 is an illustration of the formation of a new reformed term-to-document matrix;

DETAILED DESCRIPTION

Figure 1:
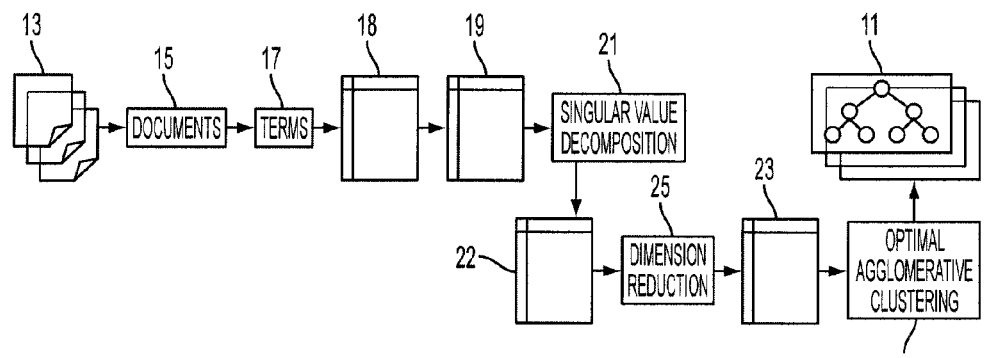
FIG. 1 is a simplified block diagram of an overview of the formation of a hierarchy of clustered documents.
Figure 2:
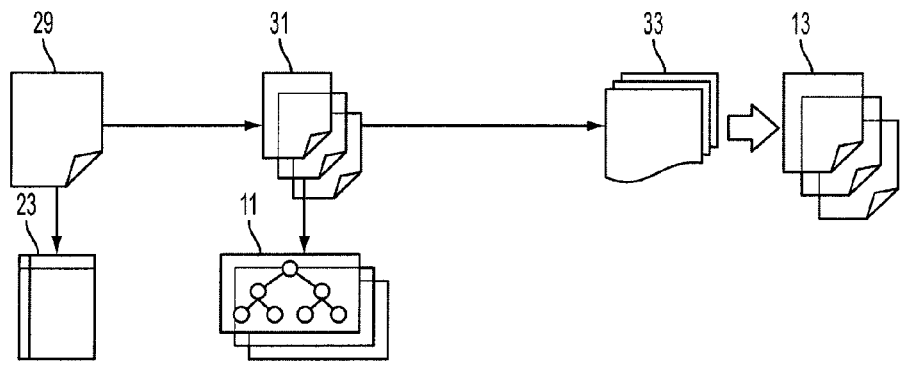
FIG. 2 is a simplified block diagram of an overview of the query process and fisheye output.
Figure 3:
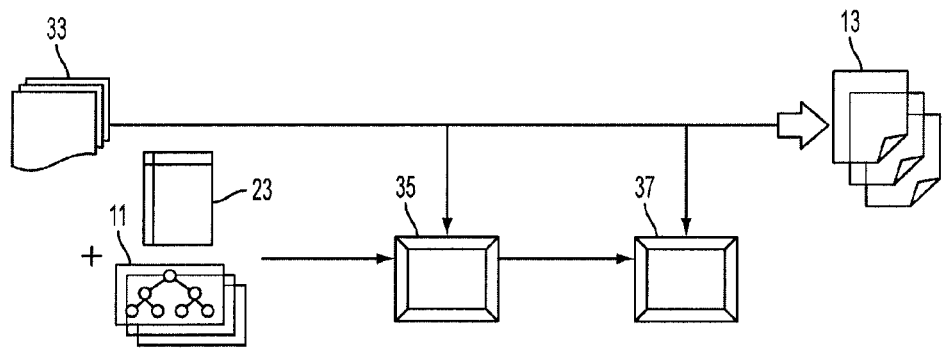
FIG. 3 is a simplified block diagram of an overview of the topical concept maps and the topical outline maps.

FIGS. 1-3 represent an overview of one embodiment of the kPOOL invention. FIG. 1 displays kPOOL's process of forming a hierarchy of clustered documents 11. kPOOL accesses a domain corpus 13 representing textual material. kPOOL parses the domain corpus 13 into a plurality of documents 15. kPOOL parses the domain corpus 13 by segmenting the length of the domain corpus' 13 textual material into distinct lengths of text. Each distinct length comprises a document 15. kPOOL then parses each document 15 into a series of terms 17 corresponding to each document 15. kPOOL forms a term-to-document matrix 18 that correlates each document 15 with the series of terms 17 corresponding to each document 15. kPOOL then forms a weighted term-to-document matrix 19 using global and local weighting. kPOOL performs a singular value decomposition 21 on the weighted term-to-document matrix 19. The singular value decomposition 21 creates three orthogonal matrices: left and right singular vector matrices and a singular value matrix 22. kPOOL truncates the singular value matrix 22 to reduce dimensionality 25 before producing a reformed term-to-document matrix 23 that reveals the semantic relationships. kPOOL then performs an optimal agglomerative clustering 27 operation on the reformed term-to-document matrix 23, to form an initial layer of a hierarchy of clustered documents 11. The process of optimal agglomerative clustering 27 may be performed iteratively to form higher layers on the hierarchy of clustered documents 11. Either an initial layer, or higher layers on the hierarchy of clustered document 11, may be classified as "topics" formed by the documents, or groupings of documents related to a common concept.

FIG. 2 displays a natural language query 29 applied to the reformed term-to-document matrix 23. The natural language query 29 maps into the reduced dimensional space of the reformed term-to-document matrix 23 and retrieves relevant documents 31. kPOOL may correlate the relevant documents 31 to the hierarchy of clustered documents 11, to retrieve information regarding the topics the relevant documents 31 fall into. A fisheye view 33 displays the topics that correlate to the relevant documents 31. The fisheye view 33 displays short phrases from the relevant documents 31 and contains hyperlinks linking the short phrases directly to the domain corpus 13.

FIG. 3 displays kPOOL's method of presenting semantic relationships between documents on a two-dimensional self-organizing map. kPOOL forms the self-organizing map using semantic relationships between documents in the reformed term-to-document matrix 23. kPOOL may form a self-organizing map representing a topical concept map 35 by filtering out terms in the reformed term-to-document matrix 23 that do not correspond to a selected document. kPOOL may supervise the distribution of documents in the topical concept map 35 with the topic membership of the documents, as derived from the hierarchy of clustered documents 11. In addition, kPOOL may create a large-scale topical outline map 37 over a larger domain corpus than used in the topical concept map 35. The fisheye view 33 may contain a hyperlink to the topical concept map 35 and the topical outline map 37. The fisheye view 33, the topical concept map 35, and the topical outline map 37 all may contain hyperlinks to the domain corpus 13.

Figure 4:
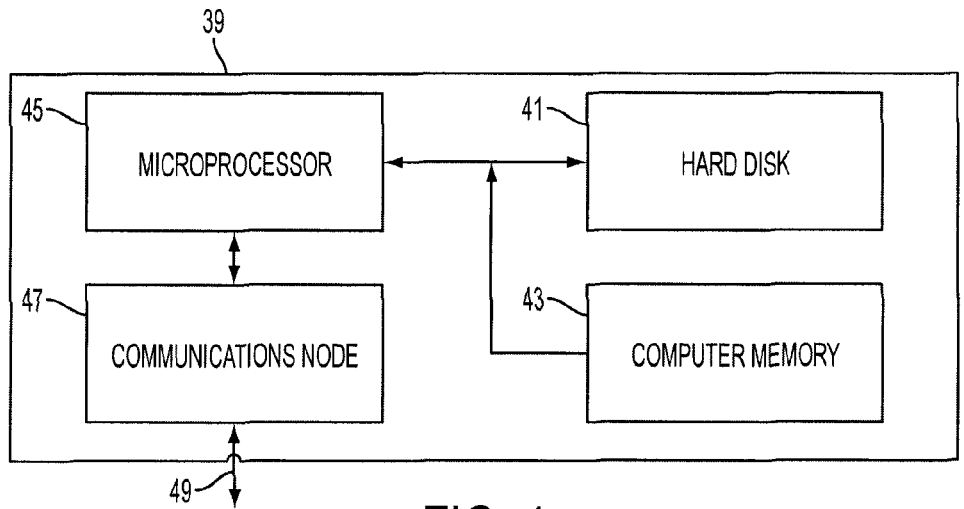
FIG. 4 illustrates a computer system for executing the present invention.

FIG. 4 shows an exemplary computer system 39 used to implement the kPOOL invention. The computer system 39 is comprised of a hard disk 41, a computer memory 43, a microprocessor 45, a communications node 47, and a communications link 49. The hard disk 41 or computer memory 43 stores the processes used to implement the kPOOL invention and stores information delivered from the microprocessor 45. The hard disk 41 or computer memory 43 may also store the domain corpus 13 accessed by kPOOL, as discussed in relation to FIG. 1. The microprocessor 45 may comprise a single-core, or multi-core processor, as is known to one of skill in the art, and executes all the processes used to implement the kPOOL system, including the formation of the term-to-document matrix 18 and creation of the hierarchy of clustered documents 11. The microprocessor 45 may access a domain corpus 13 located on the hard disk 41 or computer memory 43, or may access a domain corpus 13 delivered from the communications node 47. The communications node 47 may be a modem, ethernet card, or other communications device capable of communicating with other computer systems. The communications node 47 communicates with other computer systems via a communications link 49. The communications node 47 may access a domain corpus 13 located outside the computer system 39 for use in the kPOOL system.

Figure 5:
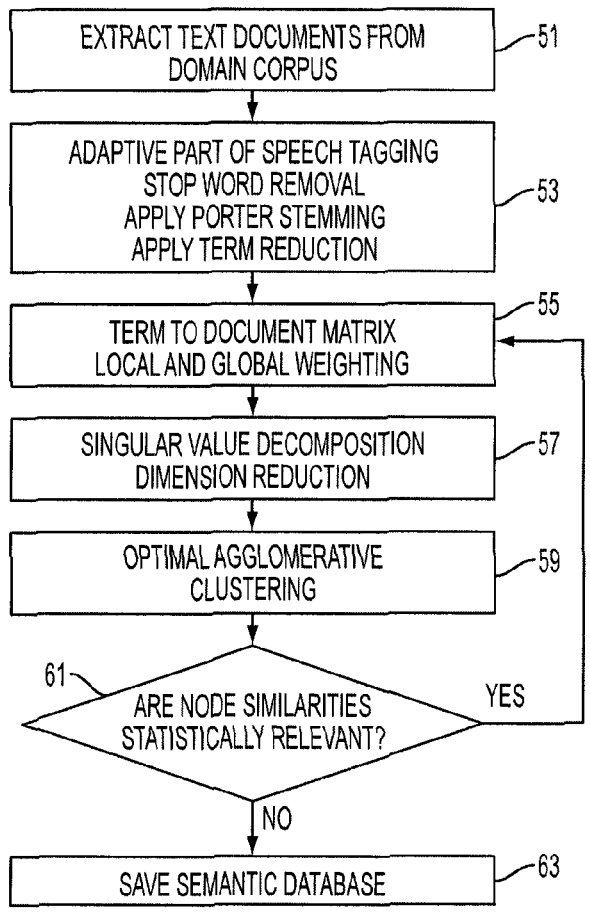
FIG. 5 is a flowchart illustrating steps for the formation of a hierarchy of clustered documents.

FIG. 5 shows an exemplary flowchart representing the process of creating clusters of documents, to form a hierarchy of clustered documents 11, as shown in FIG. 1. In step 51, kPOOL extracts text documents 15 from the domain corpus 13, as shown in FIG. 1. In step 53, and as referenced in FIG. 1, kPOOL parses the documents 15 into terms 17, by performing part-of-speech (POS) tagging, adaptive stop word removal, porter stemming, and term reduction, to the terms in the documents 15. In one embodiment, kPOOL may retain proper names and geographic indicators in a shallow parsing process. In step 55, kPOOL creates a weighted term-to-document matrix 19 that correlates the terms 17 to their respective documents 15, as discussed in relation to FIG. 1. In step 57, kPOOL performs a singular value decomposition 21 and dimension reduction 25 on the weighted term-to-document matrix 19, creating a reformed term-to-document matrix 23, as discussed in relation to FIG. 1. In step 59, kPOOL performs an optimal agglomerative clustering 27 operation on the reformed term-to-document matrix 23 and clusters documents located within the reformed term-to-document matrix 23, as discussed in relation to FIG. 1. In step 61, kPOOL determines whether the optimal agglomerative clustering 27 operation has occurred enough times such that the similarities between nodes are no longer statistically relevant, such that no further clustering will combine similar nodes. If the optimal agglomerative clustering 27 operation has not occurred enough times such that the node similarities are no longer statistically relevant, then kPOOL repeats steps 55, 57 and 59 until the node similarities are no longer statistically relevant. Once the node similarities are not longer statistically relevant, the semantic database is saved 63 to the hard disk 41 or computer memory 43, as shown in FIG. 4. In one embodiment, the optimal agglomerative clustering 27 operation occurs for five iterations. The optimal agglomerative clustering 27 operation, repeated five times, will thus form a five-layered hierarchy of clustered documents. In one embodiment, higher or lower levels of optimal agglomerative clustering 27, as shown in FIG. 1, may also be achieved within the scope of this invention, depending upon either or both the level of reliability desired and/or the complexity of the data being processed.

Figure 6:
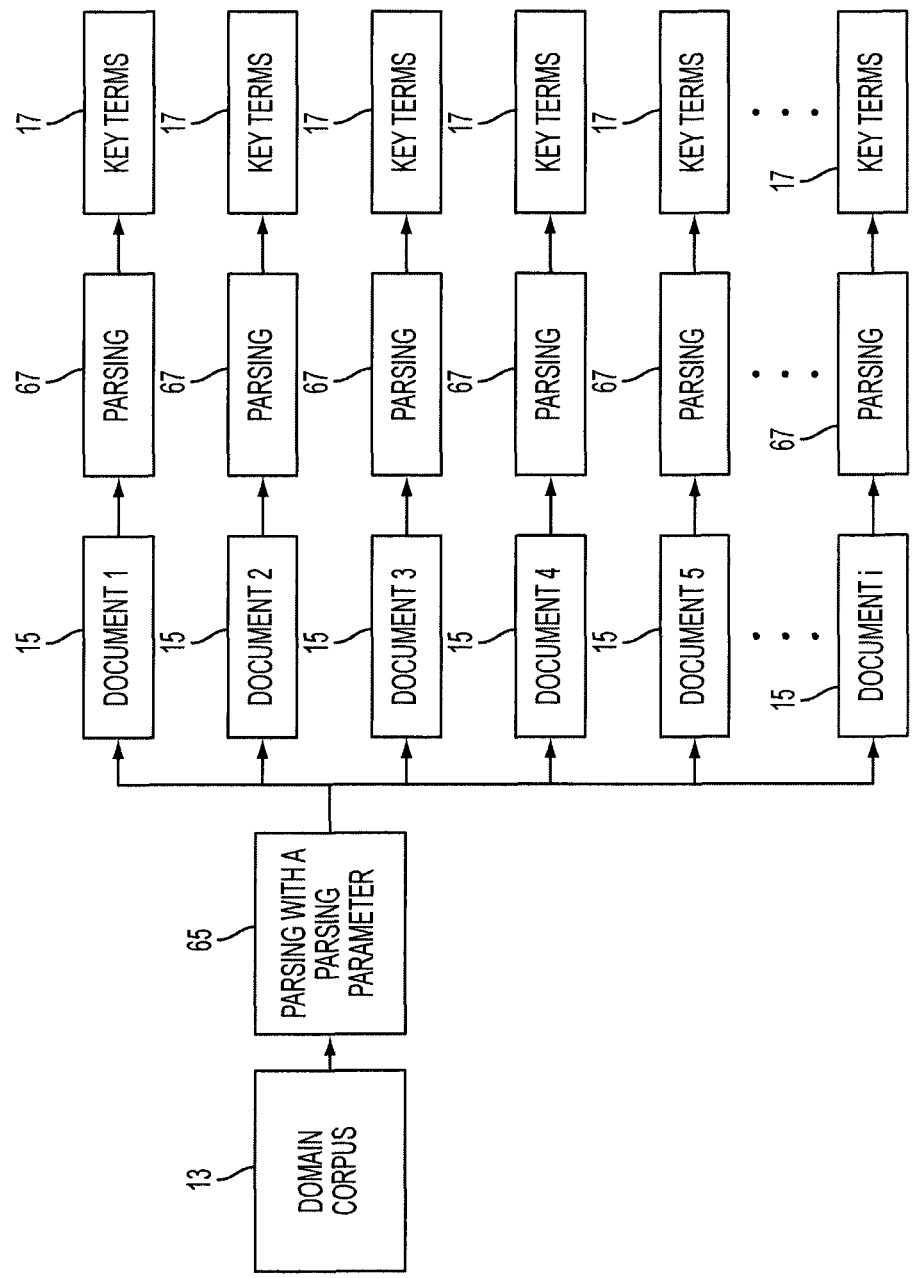
FIG. 6 is simplified block diagram of the domain corpus parsing and the document parsing.

FIG. 6 illustrates steps 51 and 53 of FIG. 5, of accessing and parsing a domain corpus 13. The process shown in FIG. 6 comprises variations on standard Latent Semantic Analysis techniques that kPOOL utilizes to implement the methods contemplated by the present invention. As shown in FIG. 6, kPOOL initially accesses a domain corpus 13. The domain corpus 13 may generally be any textual material, or material from which words are structured in a manner to convey information to a reader. Such textual material may include material on a website, a book, a collection of books, newspapers, legal case law, or any other material that is read by an individual. In addition, the domain corpus 13 may be material an individual does not normally read, including a series of symbols or text such as statistics or parameters. Such alternative embodiments of a domain corpus 13, are shown and described in relation to FIGS. 34-36 and may include multiple forms of machine-readable data. All embodiments of the domain corpus 13 discussed throughout this application, may be either classified as textual material, symbols, or machine-readable data. In a preferred embodiment, kPOOL reads through textual material comprising the domain corpus 13. In one embodiment, the domain corpus 13 may comprise the corpus of closed captioning text, which includes interpretive information for movies or televised media for the visually or aurally impaired. A domain corpus 13 of closed captioning text may allow for efficient structuring and search of movies, videos, or televised media.

kPOOL creates a listing of words within the domain corpus 13. kPOOL parses 65 the listing of words by dividing the words into segments. Each segment forms a document 15. kPOOL preferably divides the domain corpus 13 in a manner that each document 15 expresses a single concept.

kPOOL uses a parsing parameter to divide the listing of words into documents 15. The parsing parameter represents a particular quantity of words that will comprise each document 15. The parsing parameter may be fixed or be variable. The parsing parameter may be varied to include full sentences or full paragraphs in each document 15. For example, if the parameter is set to divide a domain corpus 13 into documents 15 of a twelve word length, and a sentence contains thirteen words, then kPOOL will vary the parsing parameter to include thirteen words. kPOOL attempts to include full sentences to assure that each document 15 will contain a coherent thought and retain the syntax structure traditionally used to convey information. Moreover, kPOOL's parsing parameter may be varied to include full paragraphs in one document 15. For example, if the parameter is set to divide the domain corpus 13 into documents 15 of a twelve sentence length, and a paragraph contains thirteen sentences, then kPOOL will extend the length of the document 15 to include thirteen sentences. kPOOL may vary the parsing parameter indefinitely to create documents 15 with an extensively variable number of words.

The parsing parameter may also be varied according to the particular domain corpus 13 kPOOL will parse. For example, in a literary or prose domain corpus 13, kPOOL may increase the parsing parameter to include more sentences because each sentence likely contains less information expressing one coherent thought. However, in a technical or legal domain corpus 13, kPOOL may decrease the parsing parameter because each sentence likely contains a single coherent expression distinct from the other sentences in the work.

In a preferred embodiment, the present invention parses prose text and sets the parsing parameter to create documents 15 of no less than five sentences and no more than fifteen. In this preferred embodiment, the parsing parameter is set such that documents are appended and split to meet the five sentence and fifteen sentence range. This preferred embodiment enhances the simplicity of the parsing process.

In an alternative embodiment, the parsing parameter may be determined by the length of the domain corpus 13. In another alternative embodiment, the parsing parameter may be set according to the inherent textual structure of a domain corpus 13. For example, in a technical work divided by headings and subheadings, kPOOL may set the parsing parameter to create documents 15 of a length defined by the subheadings.

The documents 15 in FIG. 6 extend from Document 1 to Document i, where "i" represents a fixed number. The number of documents represented by "i" will depend on the size of the domain corpus 13 and the parsing parameter used to parse the domain corpus 13. Each document 15 may contain a different number of words depending on whether the parameter varied during the parsing process 65.

kPOOL thus parses 67 each document 15 into at least one key term 17 that corresponds to the document. kPOOL maintains an index of the key terms 17 that correspond to each document 15. Parsing 67 each document 15 may include the processes of part of speech (POS) tagging, adaptive stop word removal, porter stemming, and term reduction. These parsing 67 processes transform a document 15 composed of a series of words into a group of key terms 17 that express the concept underlying each document 15.

The process of part of speech tagging includes determining within each document 15, which parts of speech correspond to certain terms 17. For example, if the term "train" is used as a noun in a certain document 15, then that term 17 will be marked as a noun. If the term "train" is used as a verb in a certain document 15, then that term 17 will be marked as a verb. The part of speech tagging may occur for all terms 17 in the document 15, or may be limited to those terms 17 with multiple possible associated parts of speech.

The process of adaptive stop word removal removes words that do not add substantive value to a document, such as articles or conjunctions or words that simply add little meaning to the document. However, the process of adaptive stop word removal is "adaptive," because it is based on the part of speech tagging. The tagging of the part of speech will allow adaptive stop word removal to determine if the word adds substantive value to the document. For example, the term "train" as a noun may have a high substantive meaning in a document, but the term "train" as a verb may not. Adaptive stop word removal may be used to only remove terms that do not add substantive content to a document, within the context of the document.

The process of porter stemming is used to reduce each word to its root word, for example, the word "conjoined" would be reduced to the word "join." Further, term reduction serves to exclude words that are infrequently or over-frequently used in a passage. Words that are infrequently or over-frequently used likely do not substantively add meaning to a document 15.

In one embodiment, kPOOL may use a technique of shallow parsing to retain the proper names or geographical indicators in the document 15. In traditional Latent Semantic Analysis techniques, terms can become confused, effectively obfuscating the semantics. For example, New York and York are indistinguishable because New is treated like the adjective "new." Using shallow parsing, New York and York are both treated as separate terms. Similarly, god and God are separate terms. Also, the who-where-when terms comprising the terms related to names, locations, and dates, are tagged for additional filtering of retrieved information. Thus, in this embodiment, kPOOL may identify and retain proper names, locations and dates, as terms parsed from each document 15.

As an example of the parsing process 67, the document 15 may contain the sentence: "The husband John renders to his wife the feelings owed her, and likewise also the wife to her husband." kPOOL first tags each word with a part of speech identifier. The part of speech identifier may be stored in a database, for retrieval during adaptive stop word removal. After the parts of speech have been tagged, kPOOL performs an adaptive stop word removal process, and retains the words: "husband, John, renders, wife, feelings, owed, wife, husband." kPOOL then performs porter stemming to retain the words: "husband, John, render, wife, feel, owe, wife, husband." kPOOL then performs term reduction to result in the words "husband, John, render, wife, feel, owe." In an embodiment in which shallow parsing is used, the shallow parsing assures the name "John" is not filtered out during the parsing process 67.

After the parsing process 67, kPOOL retains a listing of the documents 15 and the key terms 17 corresponding to each document 15. In addition, kPOOL may retain a listing of the parts of speech corresponding to each term 17 in the document 15.

Each key term 17 may appear in various documents 15. kPOOL forms a term-to-document matrix 18 that represents the correlation between the key terms 17 and documents 15, as discussed in relation to FIGS. 1 and 5.

Figure 7:
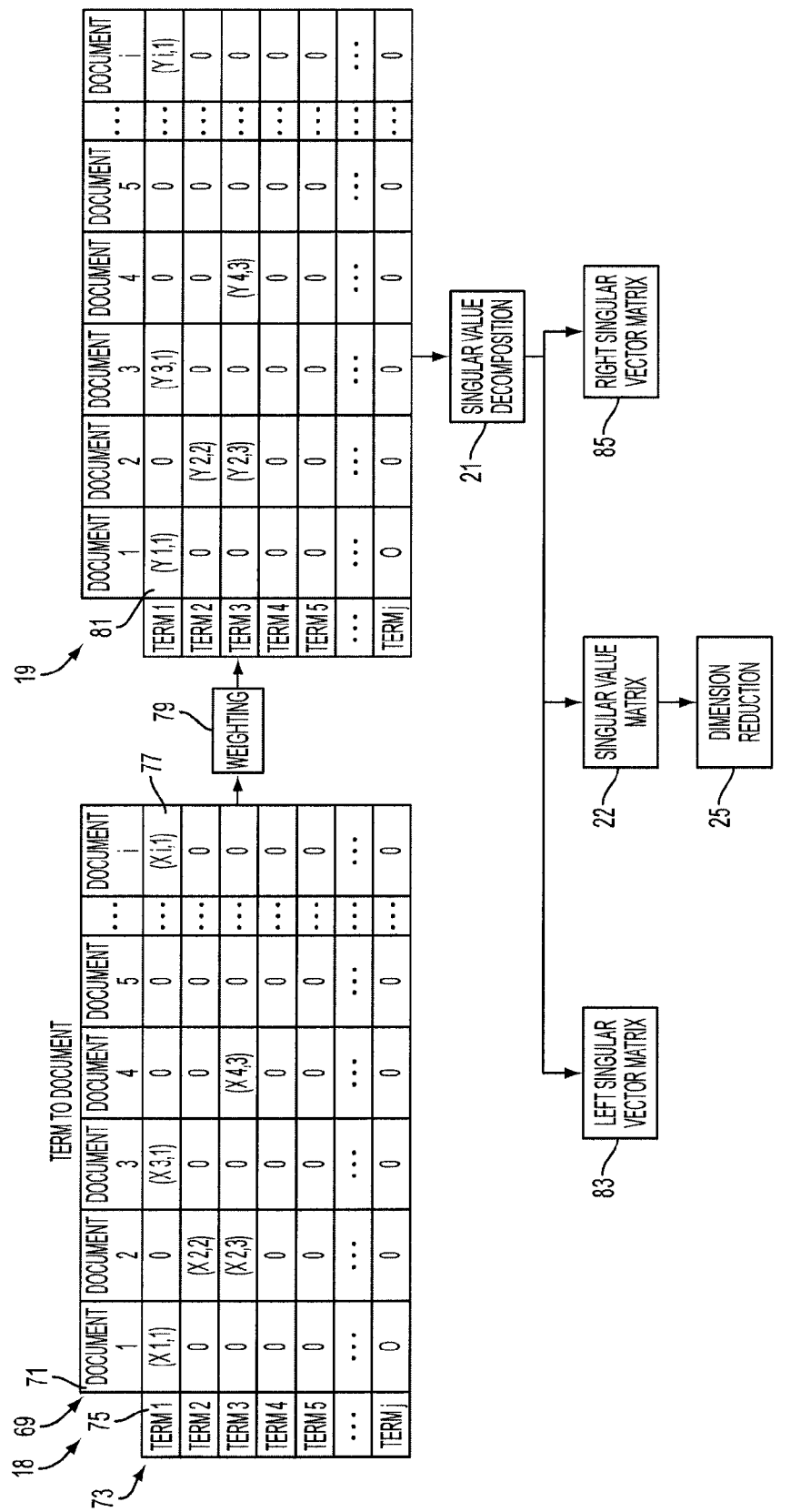
FIG. 7 is an illustration of formation of matrices and the singular value decomposition.

FIG. 7 represents steps 55 and 57 shown in FIG. 5. FIG. 7 illustrates that kPOOL forms a term-to-document matrix 18 correlating the documents 15 derived from the domain corpus 13 to the key terms 17 parsed from each document 15, as discussed in relation to FIG. 1. The term-to-document matrix 18 correlates each document 15 with the at least one term that corresponds to the document 15. The column header 69 of the term-to-document matrix 18 represents an index of the documents 15 derived from the domain corpus 13. Each column 71 corresponds to a different document 15. The row header 73 of the term to document matrix 18 corresponds to the key terms 17 parsed from the documents 15. Each row 75 corresponds to a different key term 17 derived from the documents 15. The row header 73 includes a listing all the key terms 17 derived from all the documents 15.

The entries 77 in the term-to-document matrix 18 represent values that indicate correspondence between a key term 17 and a document 15, shown, for example in FIG. 6. For example, the Term 1 is located in Document 1, and therefore a value of (X 1,1) is placed in the matrix 18. The actual numerical value of (X 1,1) may be set to "1" to indicate that Term 1 is located in Document 1. In addition, the Term 1 is not located in Document 2. Thus, the matrix entry 77 corresponding to Document 2 and Term 1 is set to a null value of "0" to represent no correspondence from Document 2 and Term 1. Moreover, Term 1 is present in Document 3, and therefore a value of (X 3,1) is placed in the matrix 18. The actual numerical value of (X 3,1) may be set to "1" to indicate that Term 1 is located in Document 3. kPOOL performs a similar process for the remaining terms in the matrix 18, extending to Document i and Term j.

The term-to-document matrix 18 represents a heterogeneous display of the correspondence between key terms 17 and documents 15. The key terms 17 and documents 15 are those shown in FIG. 6. The matrix 18 is a "sparse matrix" that only conveys information related to whether a particular key term 17 appears in a particular document 15. However, the columns 71 provide a vector representation, or "node" for each document. Each document's node is formed from the entries 77 in the term-to-document matrix 18 for that document. Thus, the at least one term that defines the document, defines a document "node" for the document.

kPOOL then applies a weighting operation 79 on the matrix 18 to give relative value to specific terms. The weighting operation 79 may be a distinct scalar multiplier applied to each term. kPOOL may determine the multiplier by detecting which key terms 17 occur in few documents 15. The key terms 17 that occur in a few documents 15 will be given greater weight because those terms 17 distinguish the documents 15 from other documents 15. Moreover, key terms 17 that appear frequently in all documents 15 will be given a low weight because they do not distinguish the documents from one another. The multiplier may differ for each entry 77 in the matrix 18.

The weighting operation 79 may include both a local and global weighting operation. The local weighting operation detects the frequency of key terms 17 relative to the same document 15. The local weighting operation weights the key term 17 relative to the other key terms 17 in the same document 15. The global weighting operation detects the frequency of key terms 17 relative to all the terms in all the documents. The global weighting operation weights the key term 17 relative to the other key terms 17 across all documents 15.

kPOOL's weighting operation 79 produces a weighted term-to-document matrix 19 that includes the weighted entries 81 of matrix 18. For example, value (X 1,1) in the term-to-document matrix 18 now corresponds to value (Y 1,1) in the weighted term to document matrix 19. The weighting operation 79 multiplies the entries 77 in the term-to-document matrix by a scalar; thus the null values in the term-to-document matrix 18 remain null in the weighted term-to-document matrix 19.

The entries 81 in the weighted term-to-document matrix 19 represent the weighted correspondence between key terms 17 and the documents 15, that are represented in FIG. 6. However, kPOOL performs a mathematical operation on the weighted term-to-document matrix 19 that serves to expose the underlying concepts inherent in each document 15.

kPOOL performs a singular value decomposition 21 on the weighted term-to-document matrix 19. The singular value decomposition 21 produces three orthogonal matrices 83, 22, 85. The singular value decomposition 21 operation of a matrix "A" is defined by the relation $A=U\Sigma V^T$, where U is an orthogonal left singular vector matrix 83, $\Sigma$ is a singular value matrix 22 representing the singular values of A, and $V^T$ is a right singular vector matrix 85. The representations of the three matrices will be known to one with ordinary skill in the art, and are more fully detailed in *Understanding Search Engines* by Michael W. Berry and Murray Browne.

The singular value matrix 22 is a diagonal matrix that lists the singular values of A from largest to smallest along its diagonal. kPOOL performs a dimension reduction 25 on the singular value matrix 22 that effectively truncates the smallest singular values from the singular value matrix 22. In other words, kPOOL sets the value of the smallest singular values to zero. The small singular values provide the distinctions between terms and documents, thus, truncating the smallest singular values reveals the latent semantic structure of the original domain corpus 13. To capture the latent structure of the domain corpus 13, kPOOL may use approximately 100 to 300 largest singular values. kPOOL may vary the number of singular values used according to the size of the domain corpus or the number of terms or documents.

Figure 8:
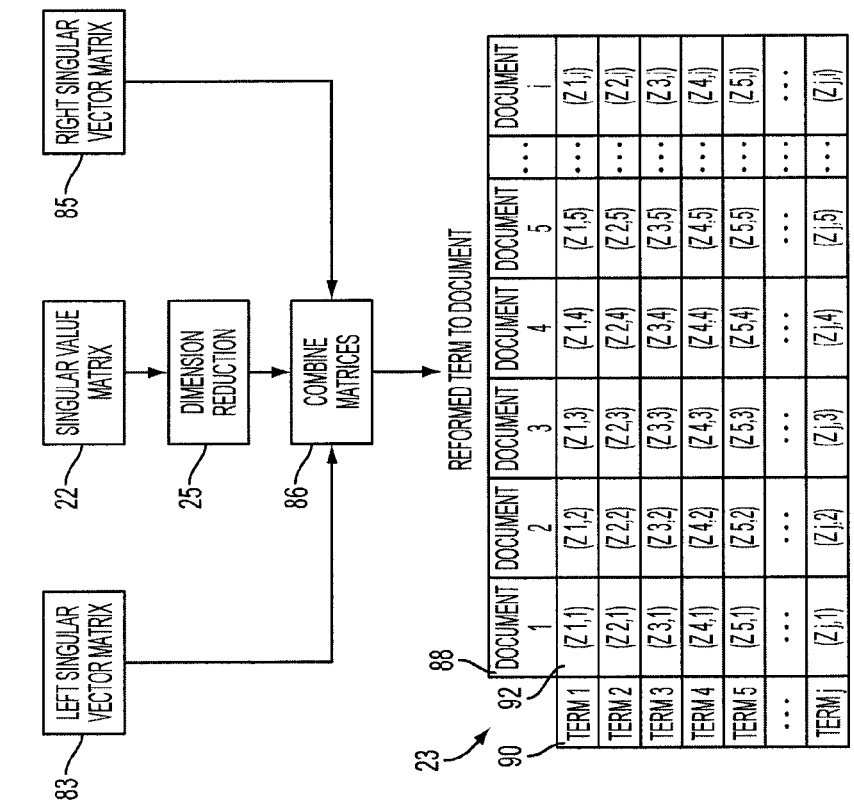
FIG. 8 is an illustration of the formation of the reformed term-to-document matrix.

FIG. 8 illustrates the process of producing the reformed term-to-document matrix 23. After kPOOL performs dimension reduction 25 on the singular value matrix 22, then the left singular vector matrix 83 and the reduced singular value matrix and the right singular vector matrix 85 are combined 86 together. Combining the matrices produces the reformed term-to-document matrix 23. The reformed term-to-document matrix 23 contains a listing of documents along the columns 88 and the corresponding terms along the rows 90. However, the entries 92 of the reformed term-to-document matrix 23 now contain no null values. The dimension reduction 25 on the singular value matrix 22 has removed the null values contained in the weighted term-to-document matrix 19.

The columns 88 now provide a vector representation, or "node" for each document. Each document's node is formed from the entries 92 in the reformed term-to-document matrix 23 for that document. Thus, the at least one term that defines the document, defines a document "node" for the document. However, due to the dimension reduction 25 step, the document nodes of the reformed term-to-document matrix 23 have fewer dimensions than the document nodes representing the documents in the term-to-document matrix 18 shown in FIG. 7.

The column corresponding to Document 1 can be mapped and compared to the column corresponding to Document 2. The "nodes" of Document 1 and Document 2 are thus compared. kPOOL may now begin the process of optimally clustering the documents, or document nodes, in the reformed term-to-document matrix 23.

Figure 9:
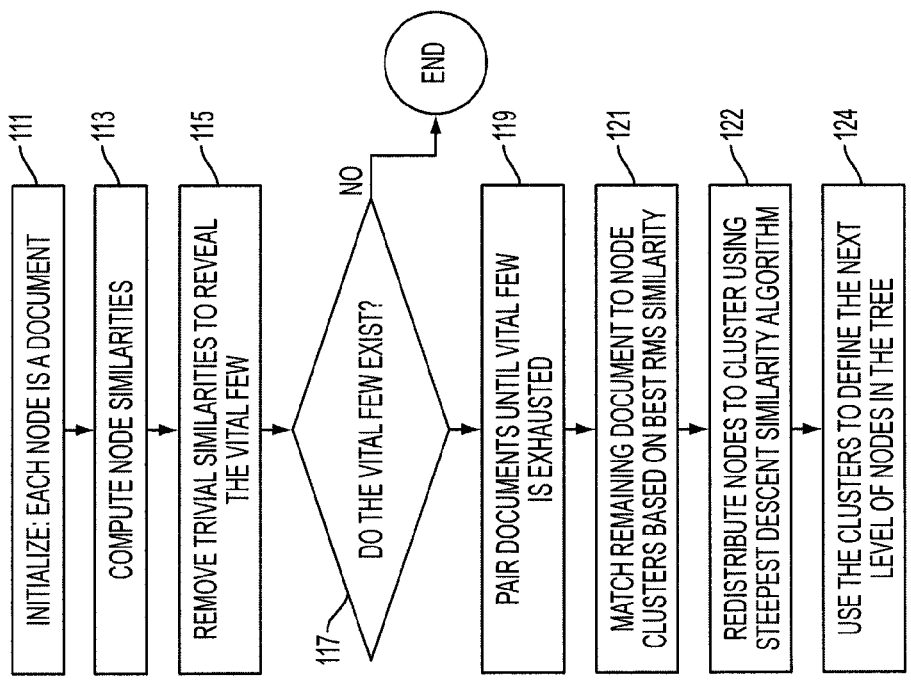
FIG. 9 is a flowchart illustrating the optimal agglomerative clustering process.

FIG. 9 is a flowchart illustrating the optimal agglomerative clustering step 59 of FIG. 5. Referring briefly to FIG. 1, the process of optimal agglomerative clustering 27 creates a hierarchy of clustered documents 11 from the reformed term-to-document matrix 23. Referring back to FIG. 9, in step 111, kPOOL is initialized, and defines each document, for example, the Document 1 shown in FIG. 8, as a node. The node is represented by the terms corresponding to each document. For example, Document 1 shown in FIG. 8 is defined as the terms from Term 1 (Z 1,1) to Term j (Z j,1). Referring back to FIG. 9, in step 113, kPOOL measures the vector, or "node" similarities of documents in the reformed term-to-document matrix 23, shown in FIG. 8 and removes non-outliers. In step 115, kPOOL performs a filtering process, to remove trivial similarities between the nodes, and to reveal "vital few" similarities between nodes. In step 117, kPOOL determines whether or not any vital few similar documents exist, that were not filtered in step 115. If no such documents exist, the process momentarily ends for that document node. If such vital few documents do exist, then, in step 119, similar nodes are paired. The pairing process continues unless all the vital few matches are exhausted. In step 121, a document node that had no match previously, in step 117, is matched to a node cluster based on the best root-mean-square similarity between the remaining document and document nodes that are already paired together. In step 122, the document nodes in the clusters are redistributed, based on a steepest descent similarity algorithm. In step 124, the nodes are used to define the next level of nodes in the hierarchy of clustered documents 11, referenced in relation to FIG. 1. The step 124 returns the process to step 111, however, now the combined documents form a new node, as will be discussed further in relation to FIGS. 18, 19, and 20. The new nodes are used to form additional layers of nodes in the hierarchy of clustered documents 11, as will be discussed in relation to FIG. 21.

The process shown in FIG. 9 forms a tree structure defined as the hierarchy of clustered documents 11, as shown in FIG. 1. The hierarchy of clustered documents 11 allows a user to query the reformed term-to-document matrix 23, as shown in FIG. 1, and retrieve not only a relevant document, but also find other documents that are similar to the retrieved document. The process of clustering allows a user to quickly find topics related to the relevant documents at multiple levels along the hierarchy.

Figure 10:
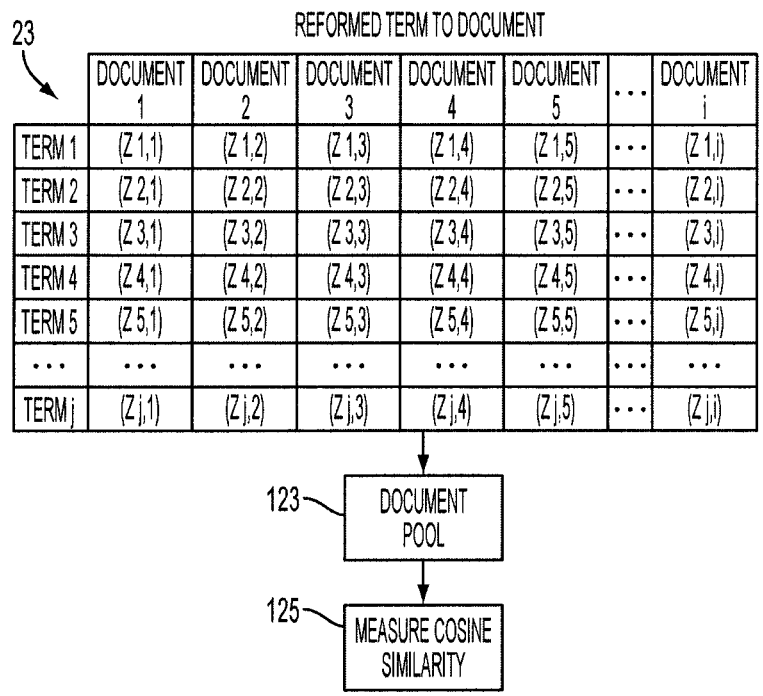
FIG. 10 is a simplified block diagram of the pairing process.

FIG. 10 represents steps 111 and 113 of FIG. 9 in the process of optimal agglomerative clustering. kPOOL initially forms a document pool 123 representing the documents 15 comprising the reformed term-to-document matrix 23, as discussed in relation to FIG. 8. The document pool 123 is simply a listing of the documents 15 in the reformed term-to-document matrix 23. kPOOL then measures the cosine similarity 125 between the documents 15 in the document pool 123. Each document is represented by a "node," meaning the measure of its vector in the vector space model. The cosine similarity is the mathematical difference between the vectors, or "node," in the reformed term-to-document matrix 23. The cosine similarity is a measure that allows two nodes of the reformed term-to-document matrix 23 to be compared against each other. In this manner, kPOOL can measure a relative difference and similarity between the documents 15 in the domain corpus 13, as shown in FIG. 1. kPOOL measures the cosine similarity between each document 15 in the document pool 123.

Figure 11:
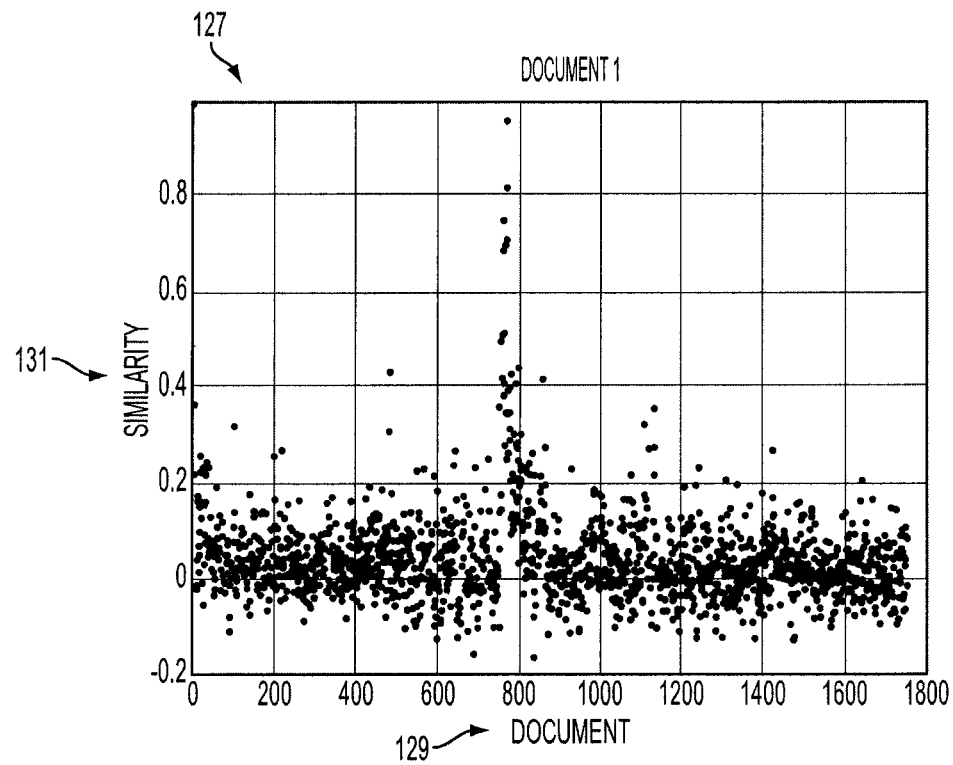
FIG. 11 is a graph of the similarity between documents.

FIG. 11 shows a graph 127 representative of the correspondence between a representative Document 1, and approximately 1750 other representative documents 15 derived from a single domain corpus 13, as referenced in FIG. 1. The graph 127 displays an index of documents 129 along the x-axis of the graph and provides a similarity measure 131 along the y-axis of the graph. The similarity measure 131 is a factor proportional to the cosine similarity of the documents 15 in the document pool 123. A larger similarity measure 131 value represents a greater similarity between Document 1 and another document.

Figure 12:
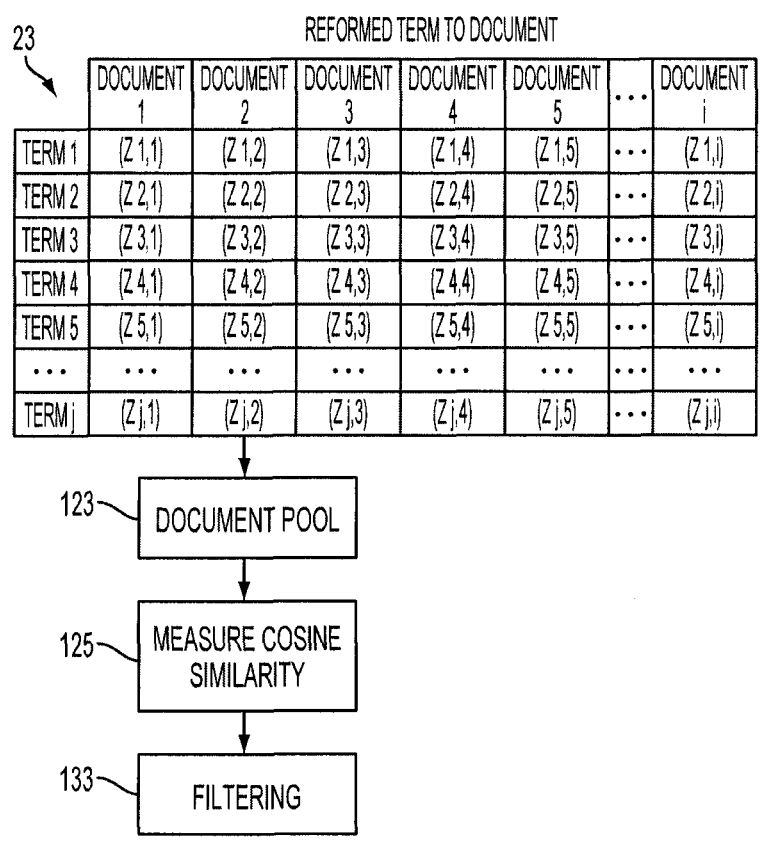
FIG. 12 is a simplified block diagram illustrating the filtering process.

For each cosine similarity measure produced by kPOOL, kPOOL filters the results to only use the outliers of the similarity measure. FIG. 12 displays the process of filtering 133 the cosine similarity produced by kPOOL. The filtering 133 process, termed the "law of the vital few," removes a group of documents which do not strongly correlate with the similarity measure of a particular document. The filtering process 133 corresponds to step 115 of FIG. 9. The filtering process 133 serves to provide a threshold value that a similarity measure between two document nodes must exceed, for the two document nodes to be considered similar enough to initially combine, or cluster together. If the similarity measure between the two document nodes does not exceed the threshold value, then the two documents nodes will not be initially combined.

Figure 13:
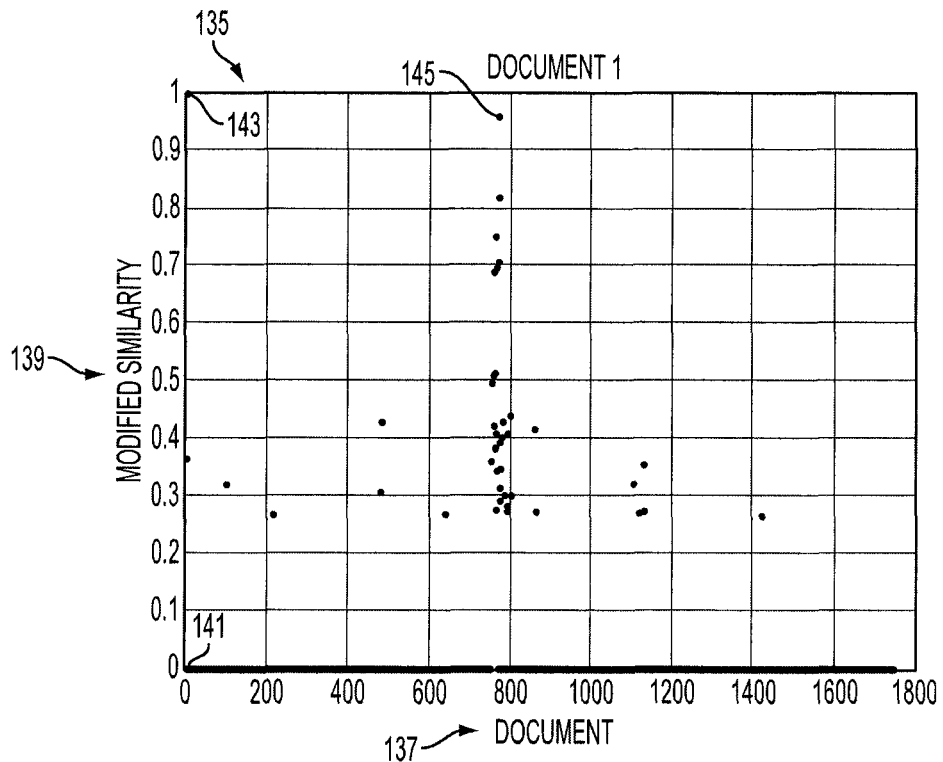
FIG. 13 is a graph of the modified similarity between documents.

FIG. 13 displays the results of the filtering process 133, referenced in FIG. 12. Graph 135 displays an index of documents 137 along the x-axis of the graph and provides a modified similarity measure 139 along the y-axis of the graph. For the documents in the graph 135, the documents at an approximate measure of 0.27 are deemed to not strongly correlate with Document 1. The similarity measure is a modified similarity measure because kPOOL sets the similarity measure of the documents 15 within the filtering range to a zero value 141.

The range of documents filtered by the "law of the vital few" may be varied depending on the particular results produced by each document. If many other documents correspond to a particular document, then the range may be set high to produce the necessary "few" corresponding documents. kPOOL may also vary the range according to the number of documents 15 parsed from the domain corpus 13, discussed in relation to FIG. 1.

In graph 135, the closest modified similarity measure 139 to Document 1 is Document 1's own similarity measure, displayed at point 143. The modified similarity measure 139 of a document to the same document is a "1" value. kPOOL thus uses the next highest modified similarity measure 139 as the document that most closely corresponds to Document 1. The next highest similarity measure is Document 766, represented at point 145. The similarity measure of Document 766 should similarly represent Document 1 as the closest match.

Figure 14:
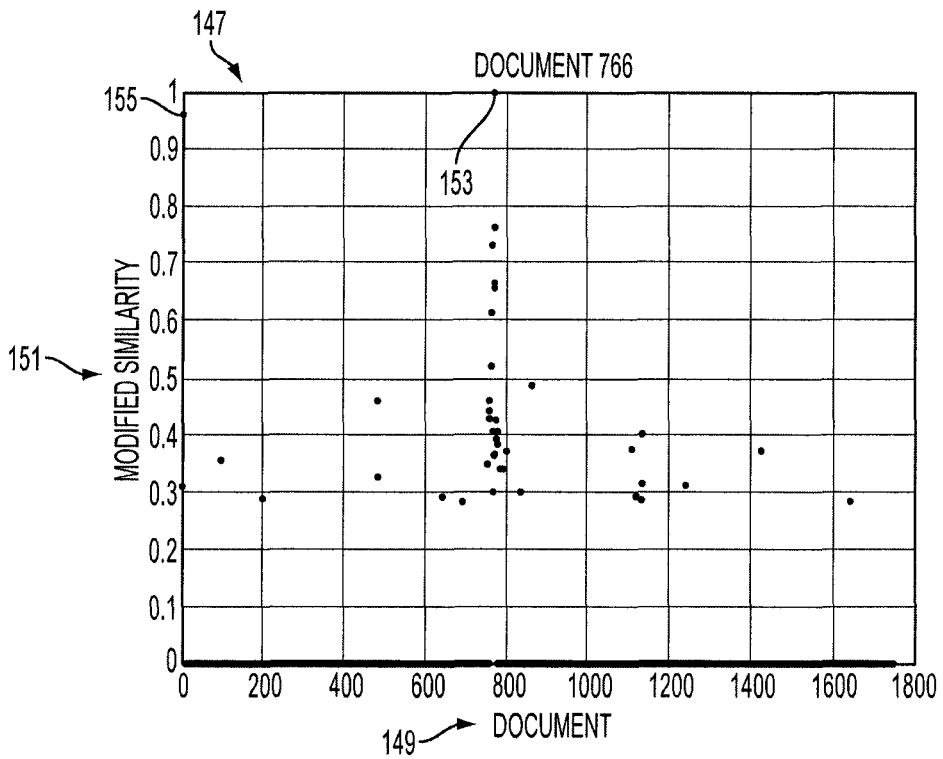
FIG. 14 is another graph of the modified similarity between documents.

FIG. 14 displays a graph 147 of the correspondence between Document 766 and the other documents with kPOOL's filter 133 placed over the results, as discussed in relation to FIG. 12. The graph 147 displays the index of documents 149 along the x-axis of the graph and provides a modified similarity measure 151 along the y-axis of the graph. Similar to graph 135, a modified similarity measure 151 of Document 766 shows a strong correspondence between Document 766 and Document 766, represented at point 153. In addition, the next highest similarity measure is with Document 1, represented at point 155. Thus, Document 766 and Document 1 correspond to one another as having the greatest cosine similarity to one another.

The process of filtering, and determining whether the "vital few" exist, corresponds to steps 117 and 119, shown in FIG. 9. If no matches are shown, that exist beyond the filter of the vital few shown in FIGS. 13 and 14, then the vital few do not exist, and the process momentarily ends for that node, as shown in relation to step 117 of FIG. 9.

Figure 15:
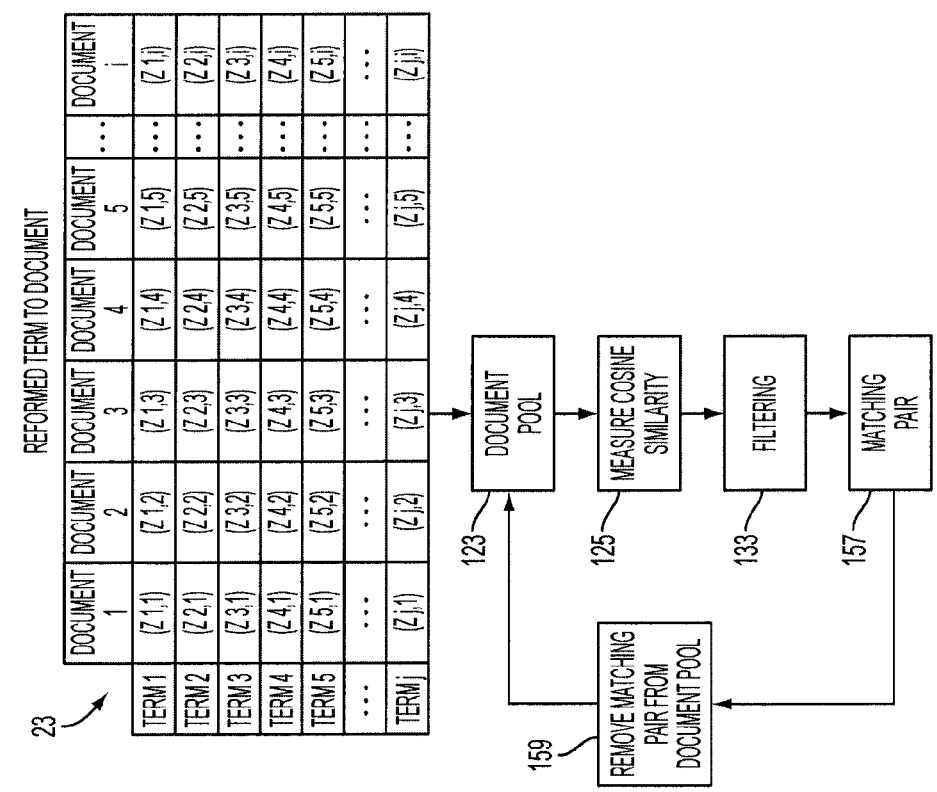
FIG. 15 is a simplified block diagram illustrating removing matched pairs from the document pool.

FIG. 15 represents the step of pairing the documents, which corresponds to step 119 in FIG. 9. After kPOOL finds a matching pair 157, also referred to as a matching node, the matching pair 157 is removed 159 from the document pool 123. Removing 159 the matching pair 157 from the document pool 123 assures that neither document that comprises the pair, will be matched with another pair at this point in the clustering process.

kPOOL continues step 119 shown in FIG. 9, including the process of measuring cosine similarity 125, matching pairs 157, and removing pairs 159 from the document pool 123 until all documents within the limit of the "law of the vital few" are paired. The "law of the vital few" filtering 133 prevents all documents 15 from being paired because some documents 15 will not correspond strongly with another document 15. Thus, some documents 15, as shown in FIG. 6, remain unpaired.

Figure 16:
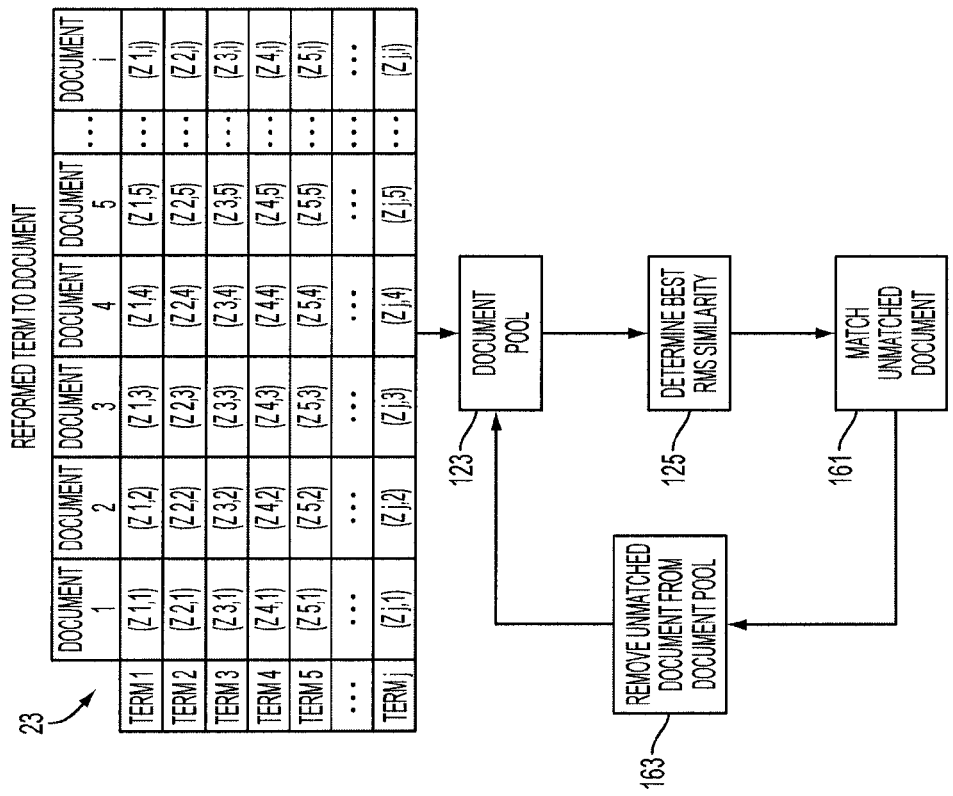
FIG. 16 is a simplified block diagram illustrating matching unmatched documents.

FIG. 16 represents step 121 in FIG. 9. The documents that comprise the unmatched documents are compared to each paired document. The similarities between the unmatched document node and each document is determined. The root-mean-square (RMS) of the similarities between the unmatched document and each of the paired documents is taken. The unmatched document node is compared to all pairs, and the root-mean-square is calculated for the pairs. The unmatched document is added to the pair that produces the best RMS similarity between the pair and the unmatched document. Once each remaining unmatched document is matched, it is removed 163 from the document pool 123. kPOOL continues the process of matching documents until all documents are paired.

The pairing process will result in clusters of documents comprising no less than two documents. In a preferred embodiment, the clusters will range in number on average between two and three documents. In an alternative embodiment, the number of documents within a cluster may be varied depending on the total number of documents 15 and the size of the domain corpus 13, as shown in FIG. 1.

Figure 17:
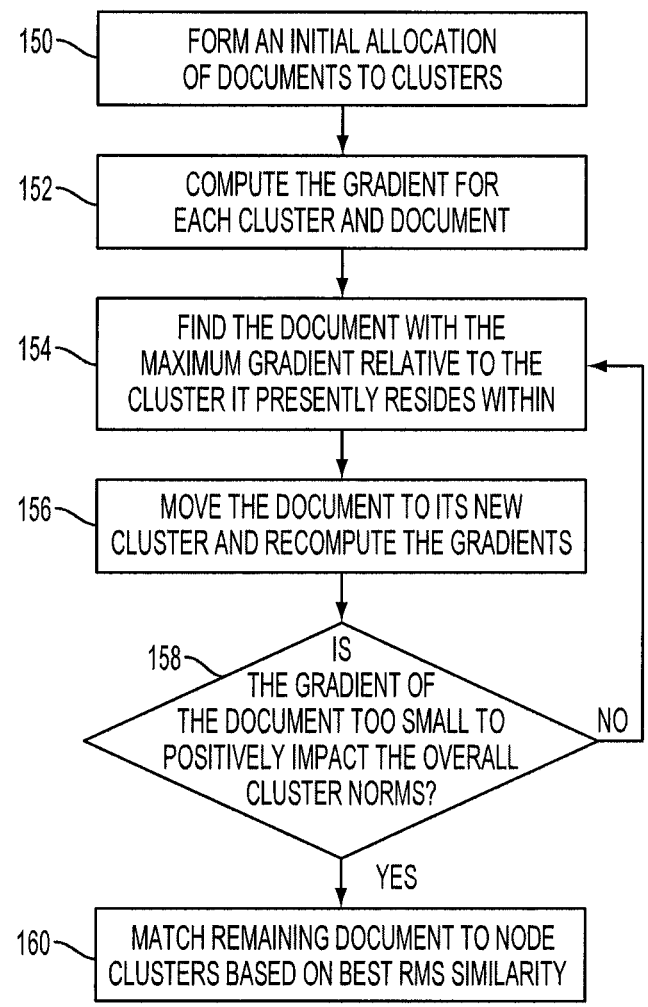
FIG. 17 is a flowchart representing a process of redistributing documents to clusters.

FIG. 17 represents the process of redistributing nodes to clusters using a steepest descent similarity algorithm, represented as step 122 in FIG. 9. The redistribution of nodes to clusters is referred to as a process of optimal agglomerative clustering. The process of redistributing nodes includes a step of initially allocating documents to clusters 150, as discussed above, and in steps 113, 115, 117, 119, and 121 of FIG. 9. Once all documents are allocated to clusters, a gradient for each cluster and document is computed 152. The gradient (g) is defined by the following equation:

$$g = \frac{(SimilarityMS_{New} - SimilarityMS_{Old})}{SimilarityMS_{Old}} \quad (1)$$

In which:

$$SimilarityMS = \sum_{i=1}^{N} \frac{(Similarity\, i)^2}{N} \quad (2)$$

$$N = \text{number of similarities} = \sum_{j}^{n-1} j \quad (3)$$

$$n = \text{number of documents in the cluster} \quad (4)$$

Under appropriate substitution of terms, the gradient equation reduces such that:

$$g = \frac{\sum_{i=1}^{N_2} l_i^2}{N_2} - \frac{\sum_{i=1}^{N_1} l_i^2}{N_1} = \sum_{i=N_1+1}^{N_2} \frac{l_i^2}{N_2} - \left(\frac{N_2 - N_1}{N_2}\right) \sum_{i=1}^{N_1} \frac{l_i^2}{N_1} \quad (5)$$

$$g = \frac{\Delta_{MS}}{C_{MS}} - \left(\frac{N_2 - N_1}{N_2}\right) \quad (6)$$

In which:

$$C_{MS} = \sum_{i=1}^{N_1} \frac{l_i^2}{N_1} \quad (7)$$

$$l_i = \text{similarity of a pair of documents} \quad (8)$$

$$N = similiarities \text{ of the cluster} \quad (9)$$
before ($N_1$) and after ($N_2$) document is added Thus, the gradient equation (6) listed above, allows kPOOL to determine the effect of each document within the cluster on the similarity measure of the entire cluster. The gradient equation (6) is applied to each cluster, and each document within the cluster. The measure $C_{MS}$ is computed by first removing a document from the cluster, such that the gradient reflects a change in similarity of the document, were the document to be added to the cluster. Each document is removed from the cluster to determine the gradient measure.

In step 154, kPOOL determines which document, or node, has the maximum gradient relative to the cluster it presently resides in. In this process, the document with the highest gradient within the cluster is identified. In step 156, the document with the highest gradient is moved from its original cluster, and placed in a new cluster. The gradient of the document and the new cluster is computed. In step 158, kPOOL determines if the gradient of all the documents, in relation to the clusters, are small enough to not positively impact the overall cluster norms. If no, then steps 154 and 156 are iterated until the gradients of the documents are too small to positively impact the overall cluster norms. If yes, then the process of optimal agglomerative clustering is complete, and the remaining documents are matched to node clusters 160.

The process of optimal agglomerative clustering, described in relation to FIG. 17, allows kPOOL to optimally group documents to the appropriate cluster. The optimal clustering assures that any initial groupings of documents are in fact the most similar groupings of documents. An optimal clustering is important, as the pairing step 119 shown, for example, in FIG. 9, will pair documents in succession, starting with the first document, and ending with the last remaining document. In addition, the process of matching remaining clusters, in step 121, will match documents in succession, starting with a first remaining document and ending with a last remaining document. The order that the documents are clustered in may improperly group documents. Thus, the optimal agglomerative clustering serves as a check, to assure the documents are in their most optimal clusters.

Figure 19:
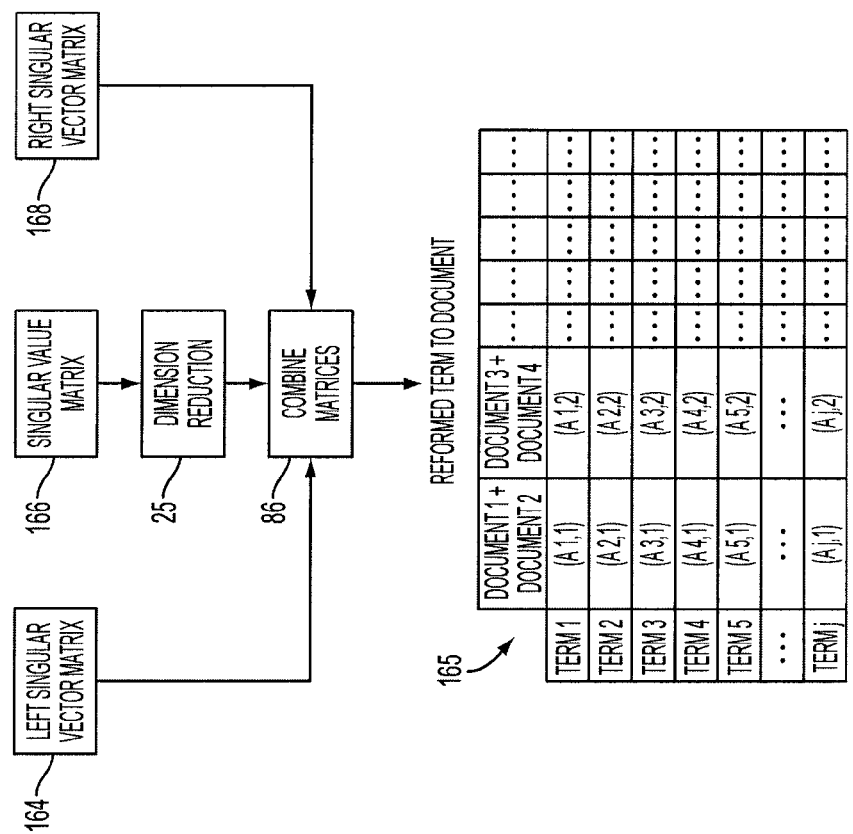
FIG. 19 is an illustration of the formation of a new reformed term-to-document matrix.

FIGS. 18 and 19 represent a process of forming a new reformed term-to-document matrix 165 representing the clustering of the document nodes. The process of forming a new reformed term-to-document matrix 165 is represented, in part, by steps 55 and 57 of FIG. 5. To form the new reformed term-to-document matrix 165, kPOOL combines the document columns 71 from the original term-to-document matrix 18 into columns that represent the clustered document nodes, as shown in FIG. 7. kPOOL combines the entries of the matrix 18 to form a combined term-to-document matrix 162, shown in FIG. 18.

For example, if Document 1 pairs with Document 2, the columns 71 are added, or summed, to form a new document column represented as "Document 1+Document 2," as shown in FIG. 18. The entries of Document 1 and Document 2 are added together. kPOOL adds all document columns 71 that correspond to the document nodes that were clustered, in the process of optimal agglomerative clustering 59, shown in FIG. 5. The document nodes of the original term-to-document matrix 18, shown in FIG. 7, are therefore combined based on the comparison of the document nodes of the reformed term-to-document matrix 23 shown in FIG. 8. If the process of optimal agglomerative clustering 59, shown in FIG. 5, determines that two nodes of the reformed term-to-document matrix 23 shown in FIG. 8 should be combined, or clustered, then the corresponding document nodes, of the original term-to-document matrix 18, shown in FIG. 7 are combined. Further, the document nodes of the original term-to-document matrix 18, shown in FIG. 7, are combined based on the steepest descent algorithm applied to the document nodes of the reformed term-to-document matrix 23, as discussed in relation to FIG. 17. For example, if kPOOL determined, in the process shown in FIG. 17, that two document nodes of the reformed term-to-document matrix 23 should not be combined, then the corresponding nodes of the term-to-document matrix 23 will similarly not be combined.

The clustering process of the original term-to-document matrix 18 is enabled, because documents of the original term-to-document matrix 18, correspond to documents of the reformed term-to-document matrix 23. The documents of the original term-to-document matrix 18 and the reformed term-to-document matrix 23 each correspond to the documents 15 that were parsed from the domain corpus 13, as discussed in relation to FIG. 1. Thus, the document node of the term-to-document matrix 18 that is combined with another document node of the term-to-document matrix 18, represents a document that is parsed from the domain corpus, that is also represented by a corresponding document node of the reformed term-to-document matrix 23. All the documents 15 are either represented by documents in the original term-to-document matrix 18 and the reformed term-to-document matrix 23.

The process of combining the document nodes of the term-to-document matrix 18 is performed iteratively until each document node is combined with at least one other document node. The combination of all document nodes in the term-to-document matrix 18 is enabled because the steps of comparing the document nodes of the reformed term-to-document matrix 23, as discussed in relation to step 59 of FIG. 5, was also performed iteratively until all document nodes were compared to at least one other document node. The process of combining all document nodes of the term-to-document matrix 18 forms a combined term-to-document matrix 162.

Once the document columns 71 are combined, kPOOL executes the same process of weighting 79 the combined term-to-document matrix 162, performing the singular value decomposition 21 on the weighted term to document matrix 167, and producing three matrices: a left singular vector matrix 164, a singular value matrix 166, and a right singular vector matrix 168. kPOOL similarly performs dimension reduction on the singular value matrix 166. FIG. 19 illustrates the combination 86 of the left singular vector matrix 164, the singular value matrix 166 after dimension reduction 25, and the right singular vector matrix 168 to produce a reformed term-to-document matrix 165 representing the combined document nodes.

Figure 20:
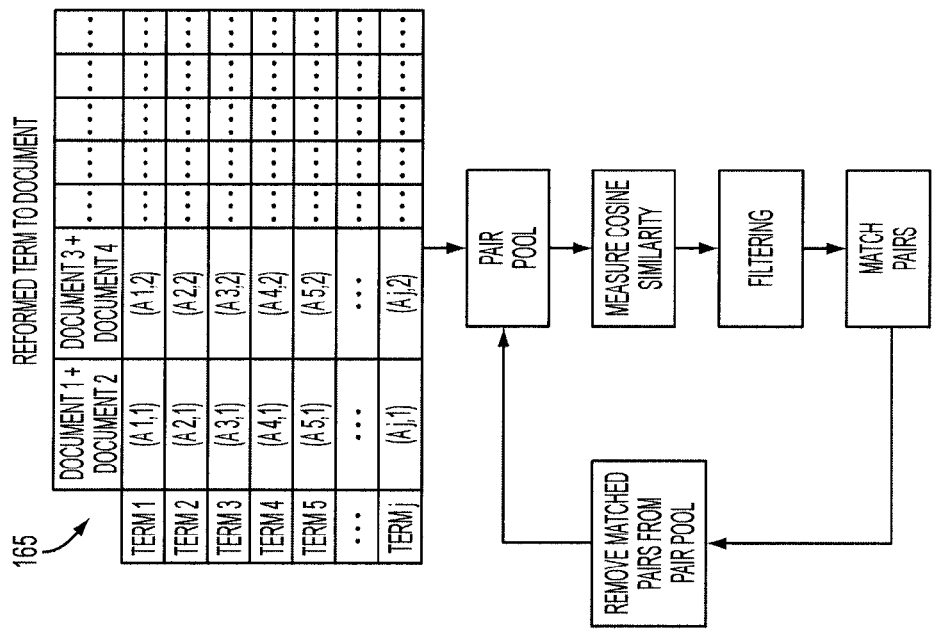
FIG. 20 is a simplified block diagram illustrating matching document clusters.
Figure 21:
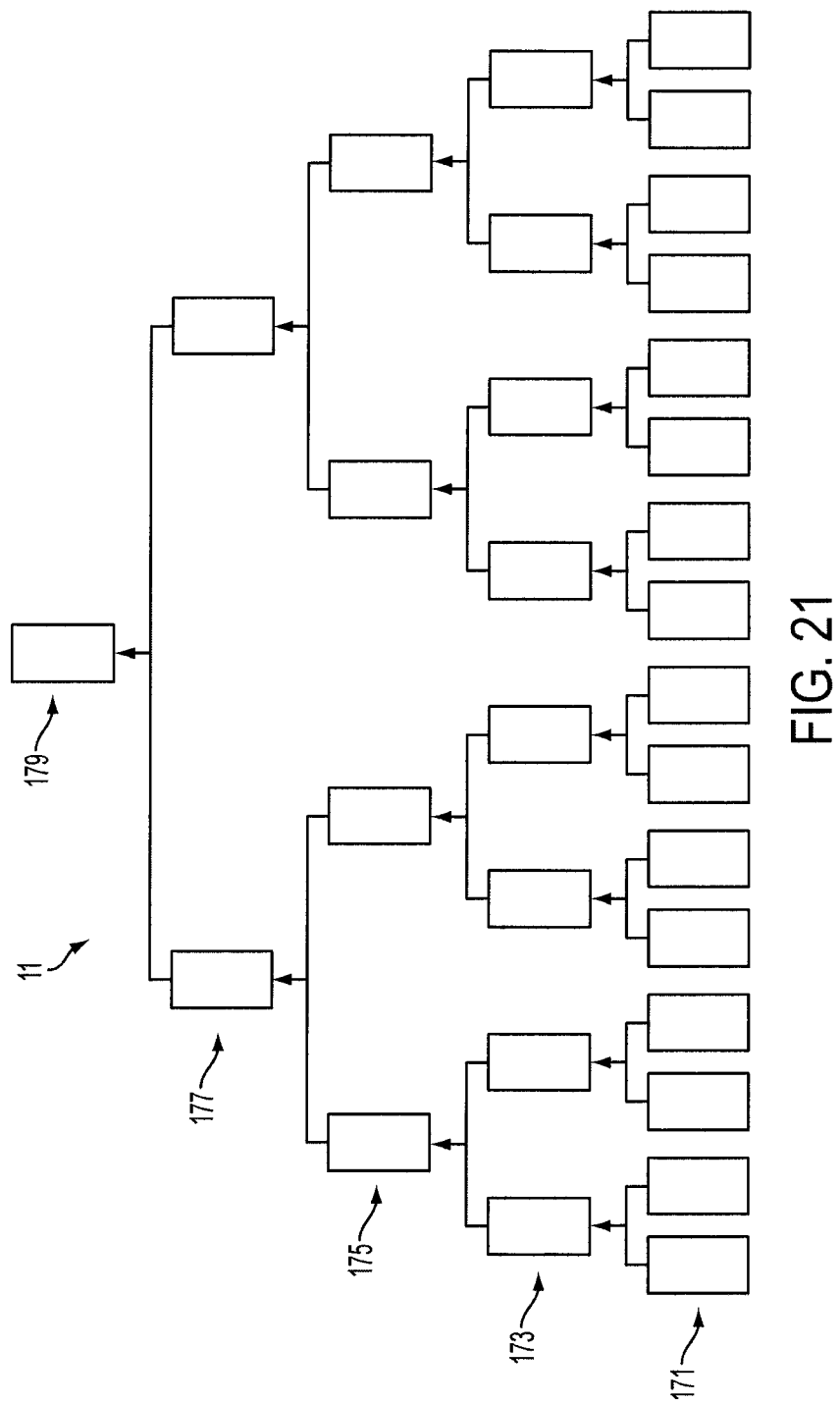
FIG. 21 is an illustration of a hierarchy of clustered documents.

FIG. 20 represents performing the same operation described in steps 111, 113, 115, 117, and 119 of FIG. 9, with the reformed term-to-document matrix 165 including nodes that represent the combination of the document nodes, shown, for example, in the term-to-document matrix 18 of FIG. 7. The nodes of the reformed term-to-document matrix 165 represent combinations, or clusters of documents. Thus, step 111 of FIG. 9, will now read: "each node is a combination of documents." After steps 111, 113, 115, 117, and 119 are performed on the reformed term-to-document matrix, then steps 121, 122, and 124 are performed. After the nodes of the reformed term-to-document matrix are combined, then a new "level" (or second level 173 of clusters, as shown in FIG. 21), in the hierarchy of clustered documents is formed. Then, steps 55 and 57 of FIG. 5 may be performed to produce yet another reformed term-to-document matrix, in which the nodes represent the combinations of the nodes for term-to-document matrix 162 shown in FIG. 18.

FIG. 21 represents a hierarchy of clustered documents 11 formed by the steps 55, 57, and 59, shown in FIG. 5. Steps 55, 57, and 59 have occurred five times to form a hierarchy of clustered documents 11. At each level, the nodes represent the combination of documents that are lower along the hierarchy. The clustering process occurs a multitude of times to create a hierarchy of first level clusters 171, second level clusters 173, third level clusters 175, fourth level clusters 177, and fifth level clusters 179. The five levels of clusters are exemplary in nature, and the number of cluster levels may be varied as desired. In a preferred embodiment, the documents are clustered until the similarities between the clusters are no longer statistically relevant, as represented in step 61 of FIG. 5.

After each successive pairing takes place, kPOOL saves the combined vector of the agglomerated document clusters, similar to the reformed term-to-document matrix 165 produced in FIG. 19, representing the first level clusters 171. Thus, for the exemplary structure shown in FIG. 21, kPOOL will save at least five matrices representing the combined document vectors corresponding to each level of the five levels.

In one embodiment, a "tree pruning" process may assure that a single cluster of documents will not include too many documents. In a tree pruning process, a cluster that is found to include too many documents, is placed two levels up in the hierarchy of clustered documents 11. Thus, the cluster will not increase in size when the documents of the next level up are clustered together. Tree pruning assures clusters do not increase too much in size as the hierarchy grows. kPOOL may use a set document size limit to determine when "tree pruning" should occur. This limit may be varied as desired. In addition, kPOOL may compare each cluster level 171, 173, 175, 177, 179 with other peer clusters, to determine if a cluster is too large, and "tree pruning" should be performed.

In FIG. 21, the first level cluster 171 represents the initial document clusters, as shown in relation to the reformed term-to-document matrix 165, the second level 173 represents the clustering of the initial clusters, the third level 175 represents what may be defined as a "topic" level, the fourth level 177 represents a combination of the topics to one another, and the fifth level 179 represents a further combination of topics to one another. Each level 171, 173, 175, 177, 179 represents an agglomerization of the documents at the level below.

Although the exemplary structure shown in FIG. 21 is symmetric in appearance, the actual hierarchy structure may be ragged in nature. The structure may be ragged, as the number of documents assigned to each cluster may vary, as discussed in relation to the optimal agglomerative clustering process 59 shown in FIG. 5.

Once the hierarchy of clustered documents 11 is formed, kPOOL may then search the matrix corresponding to the documents 15, shown in FIG. 1, in the first level clusters 171, or the second level clusters 173, and so forth. In addition, kPOOL may search the original document matrix 18 shown in FIG. 1 and retrieve the corresponding first level clusters 171, or second level clusters 173, and so forth. In this manner, kPOOL has created a broad hierarchy of clustered documents 11, that allows a user to find topics related to a relevant document.

The hierarchy of clustered documents 11, as shown in FIG. 1, is built from the bottom up, which constrains any problems in the clustering process to a lower level of the hierarchy of clustered documents 11. In a "top down" process of dividing a domain corpus, a mistake in the division would propagate down to all the clusters below.

The number of documents in each higher level must at least double because each first level 171 cluster must contain at least two documents. At a minimum, for the exemplary model shown in FIG. 21, the first level 171 will contain two documents, the second level 173 will contain four documents, the third 175 will contain eight documents, the fourth 177 will contain sixteen documents, and the fifth 179 will contain thirty-two documents.

Figure 22:
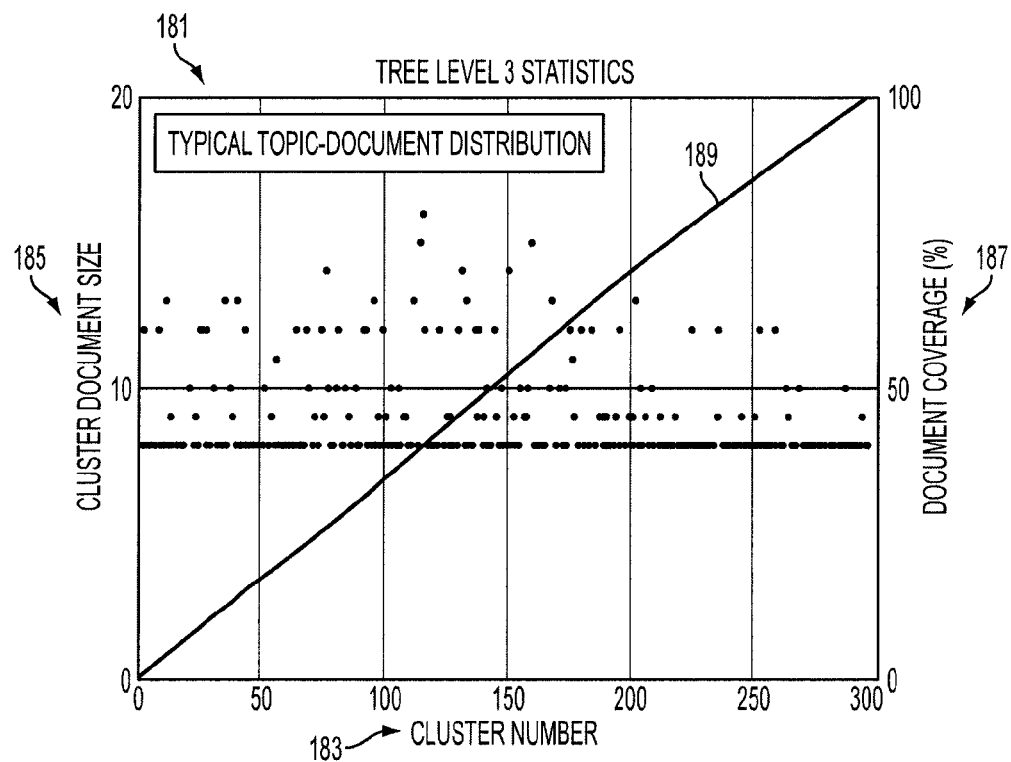
FIG. 22 is a graph of a typical level 3, topic-document distribution.

FIG. 22 is a graph 181 representing a typical distribution of documents within the clusters in a third level 175 topic distribution, as shown in FIG. 21. The graph 181 correlates the topic cluster index number 183 along the x-axis of the graph and provides the number of documents in each cluster 185 along the y-axis of the chart. The y-axis along the right side of the graph represents the percentage of document coverage 187 across the cluster index numbers 183 and corresponds to line 189. The percentage of document coverage 187 increases linearly across the topic cluster index number 183. Graph 181 demonstrates that each topic cluster, on average contains fewer than 10 documents. No third-level topic cluster contains fewer than 8 documents.

Figure 23:
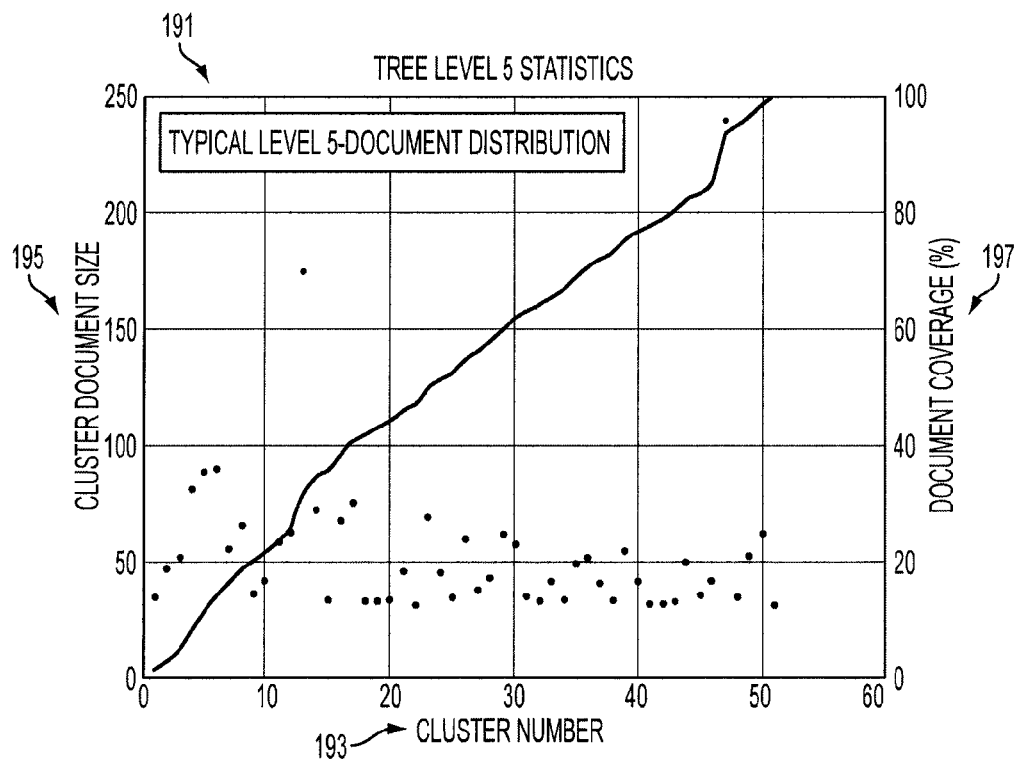
FIG. 23 is a graph of a typical level 5 document distribution.

FIG. 23 is a graph 191 representing a typical distribution of documents within the clusters in a fifth level 179 topic distribution, as represented in FIG. 21. The graph 191 correlates a cluster index number 193 along the x-axis of the graph and provides the number of documents in each cluster 195 along the y-axis of the graph. The y-axis along the right side of the graph represents the percentage of document coverage 197 across the cluster index number 193. Graph 191 demonstrates that each cluster, on average contains approximately 50 documents in a level 5 document distribution. A few clusters include substantially more documents, indicating that the document distribution may become successively skewed along higher levels of the hierarchy of clustered documents 11. No cluster contains fewer than 32 documents.

Referring back to FIG. 21, documents forming the hierarchy of clustered documents 11, are clustered until node similarities are no longer statistically relevant. Thus, for a given domain corpus 13, as shown in FIG. 1, a single hierarchy 11 may not include all the documents of the corpus 13. Multiple hierarchies 11 may be formed representing the documents of the entire domain corpus 13. These multiple hierarchies will remain unclustered, as the top levels of the hierarchies are not similar enough to be paired with other top levels of hierarchies.

Figure 24:
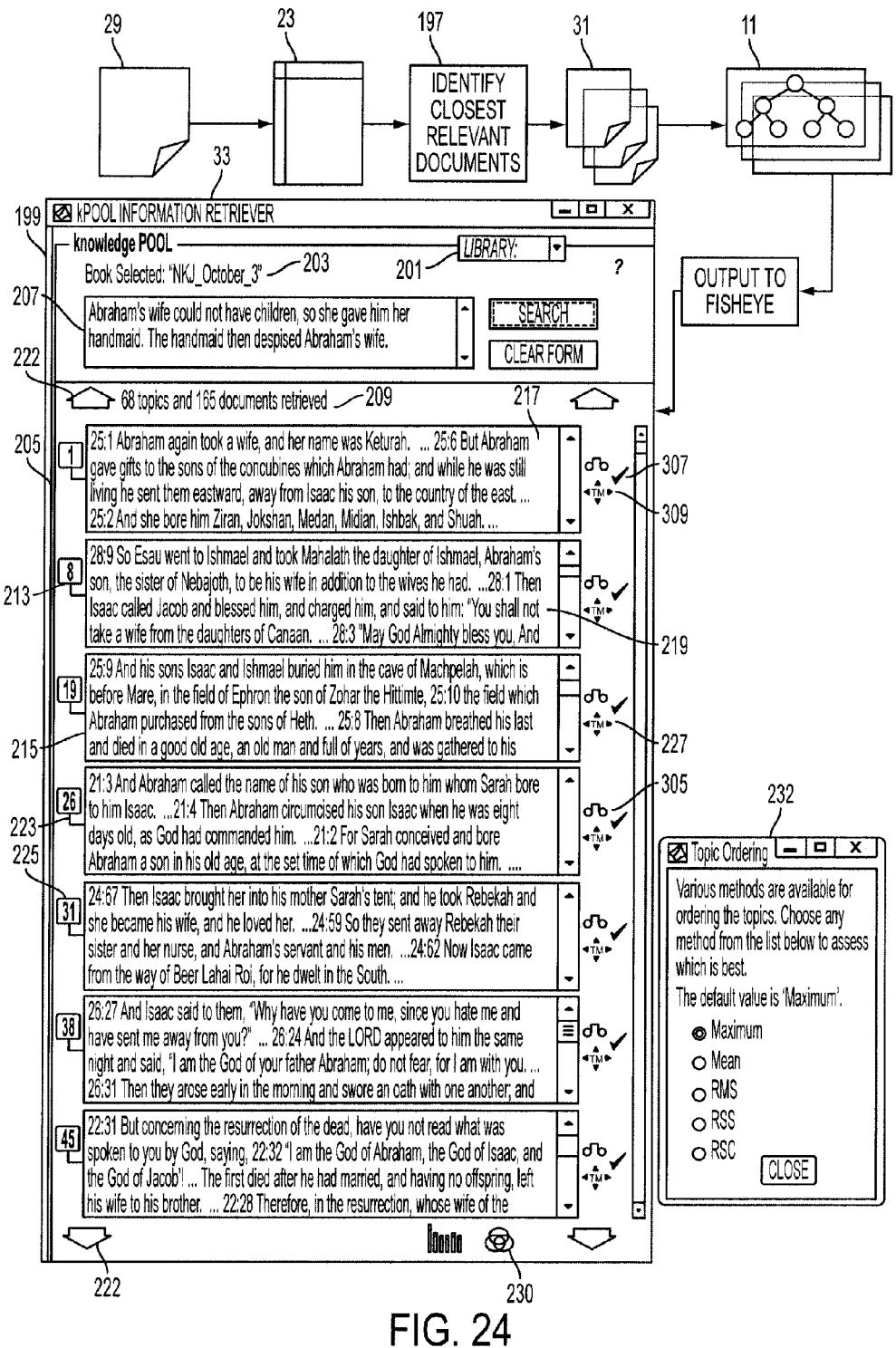
FIG. 24 is a simplified block diagram of the natural language query and fisheye output.

FIG. 24 represents the process of applying a natural language query 29 to the reformed term-to-document matrix 23, as shown in FIG. 2. The natural language query 29 allows a user to search the hierarchy of clustered documents 11 formed by kPOOL. In FIG. 24, a user inputs a natural language query 29 into kPOOL's interface. An exemplary natural language query 29 includes a listing of terms or sentences a user seeks to match with the documents 15 in the domain corpus 13, as shown in FIG. 1. kPOOL recognizes the natural language query 29 as a pseudo-document and parses the query 29 into a series of key terms, similar to the process of parsing 67 the documents 15 in the original domain corpus, as shown in FIG. 1. kPOOL then executes a query across the reformed term-to-document matrix 23 by determining the cosine similarity between the pseudo-document and the reformed term-to-document matrix 23. In other words, kPOOL queries the document nodes of the reformed term-to-document matrix 23 to produce a retrieved document. The retrieved document may comprise a plurality of documents, represented as the closest relevant documents 31. kPOOL may therefore identify 197 the closest relevant documents. The process of identifying 197 the closest relevant documents 31, may include filtering all documents and identify the closest relevant documents 31 that remain after the filtering process, in an operation similar to how documents were filtered using the "vital few" filtering 133 discussed in relation to FIG. 12. Thus, the documents are filtered to retain only a "vital few" closest relevant documents 31 that match the natural language query 29.

kPOOL may return the relevant documents 31 to the user after the initial natural language search query 29. However, in the preferred embodiment, kPOOL matches the retrieved relevant documents 31 to the hierarchy of clustered documents 11 to determine which topics 175, as shown in FIG. 21, correlate to the relevant documents 31. Thus, kPOOL may not only retrieve relevant documents 31 that closely match the search query 29, but also retrieves relevant documents 31 that were clustered with the closely matching documents in the process of optimal agglomerative clustering 59 shown in FIG. 5. The processes of optimal agglomerative clustering 59, including the filtering step 133 shown in FIG. 12, allow kPOOL to retrieve relevant documents 31 clustered with the closely matching relevant documents 31.

The "topics" as discussed herein, may represent the third level clusters 175 of the hierarchy of clustered documents 11. In one embodiment, unless otherwise noted in this application, the "topics" may refer to various levels of the hierarchy, as desired. Once kPOOL identifies the relevant documents 31 and determines which topics 175 correspond to the relevant documents 31, the results may be outputted to a fisheye view 33.

The fisheye view 33 presents a visual representation of kPOOL's retrieved results. The fisheye view 33 represents a graphical user interface upon which to display the results of the query applied to kPOOL. The fisheye view is composed of a database and query selection interface 199 and a retrieved documents output 205. The database and query selection interface 199 is comprised of a workspace drop menu 201, a database output 203, and a search box 207. The workspace drop menu 201 allows a user to select which domain corpus 13 to search, as shown in FIG. 1. The database output 203 displays which domain corpus 13 the user has selected. The search box 207 allows the user to enter a key word or phrase comprising a natural language query 29. In the particular example shown in FIG. 24, the user has selected the domain corpus 13 of "NKJ_October_3" and has entered a natural language query 29 related to Abraham's wife. In the retrieved documents output 205, kPOOL displays the number of relevant documents retrieved and the number of topics 209 that correspond to those documents. In this particular example, kPOOL retrieved 165 documents and 68 topics.

The retrieved documents output 205 is comprised of a document rank 213 and an output of short phrases 215 representing each document. The output of short phrases 215 may comprise an indicator representing a retrieved document, or relevant document 31, retrieved by kPOOL, and based on the query. The indicator is displayed on the fisheye view 33 graphical user interface.

The document rank 213 is based on a document score, which is a factor representing the similarity between the retrieved relevant document 31 and the natural language query. A higher score represents a higher similarity between the document and the natural language query. kPOOL may takes the norm, RSS, or other similar norm of the document score, of the relevant documents within a single topic, to form a topic rank. The topics are then presented in the order of the topic rank. Thus, in the retrieved documents output 205 shown in FIG. 24, the first topic 217 has a document with a document rank of 1. The first topic 217 has the highest topic rank, and is therefore listed first. The norm of the relevant documents within the first topic 217 is higher than any other topic. The first topic 217 contains six other relevant documents within the same topic. The second topic 219 has a document with a document rank of 8. The second topic 219 has the second highest topic rank because it is listed second. The norm of the relevant documents within the second topic 219 is higher than any other topic except the first topic 217.

Figure 25:
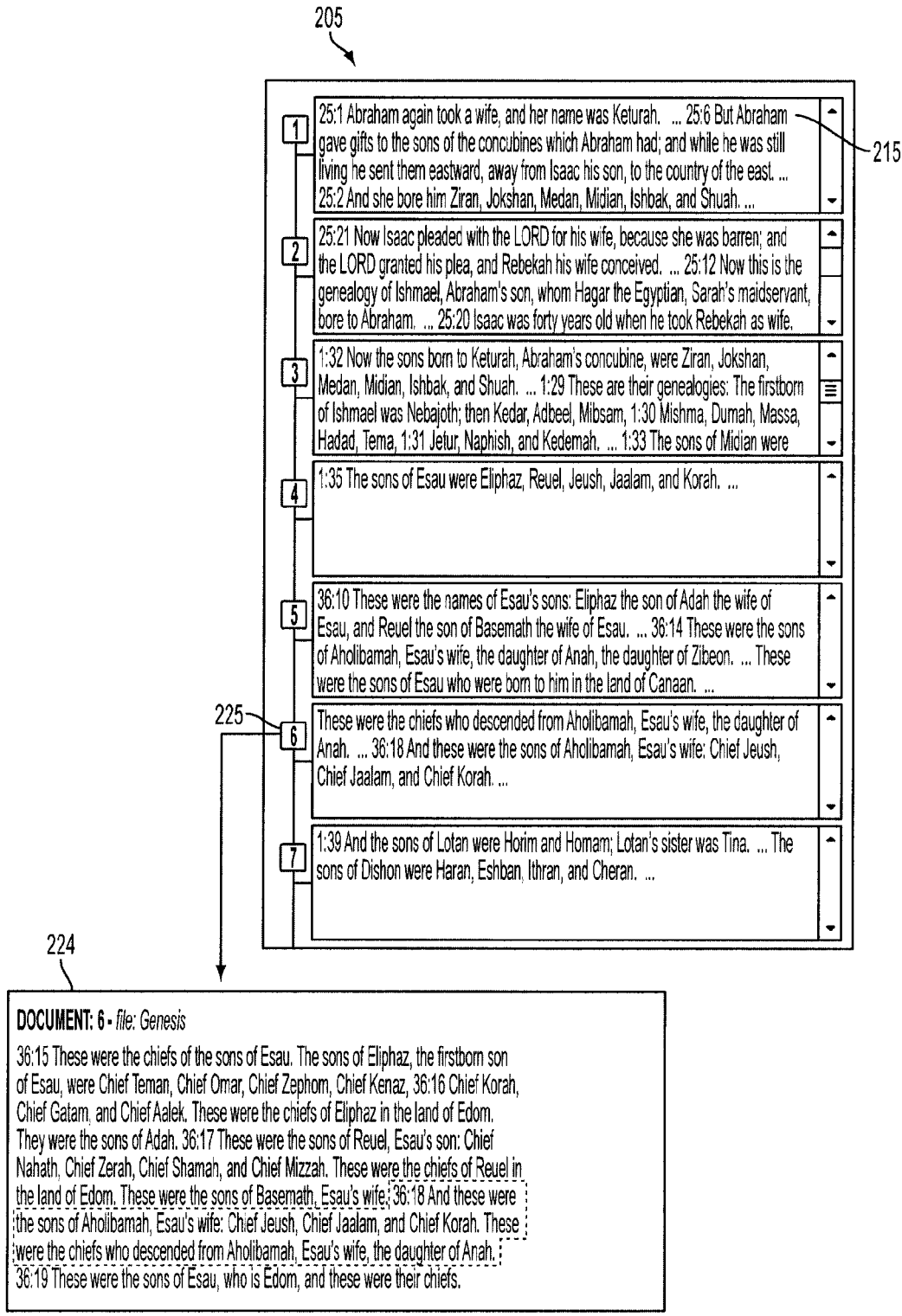
FIG. 25 is an illustration of an expanded topic listing in the fisheye view.

To view other documents within each topic, kPOOL includes a click button 223 that allows a user to expand the topic. A view of the first topic 217 after it has been expanded is shown in FIG. 25. In addition, a user may additionally click on a click button 225 to read the document referenced in the retrieved documents output 205. A window 224 that allows a user to read a document, after the click button has been clicked, is shown in FIG. 25.

Referring back to FIG. 24, additional features of the retrieved documents output 205 include arrows 222 that allow a user to scroll through the documents shown for each topic. The retrieved documents output 205 includes a topic ordering button 230 that opens a topic ordering window 232. The topic ordering window 232 allows the user to select multiple methods of ordering topics (e.g., maximum, mean, RMS, RSS, RSC). A user may select a method of ordering the topics, to allow the topic rank to be calculated based on the selected method. For example, if a user selects "mean," then the topic rank will be based on the mean document scores of the documents within that topic. Further, if a user selects "maximum," then the topic rank will be based on the maximum document score of the documents within that topic.

The retrieved documents output 205 additionally includes a "specs" button 305, an "append summary" button 307, and a topical map button 309. The "specs" button 305 opens a window that displays the text of the document, in addition to the text of other documents within that same topic. The user may quickly view the entire text of the topic, as it has been produced in various documents. The "append summary" button 307 allows a user to click on particular documents and allow the summary section of the document shown in the retrieved documents output 205 to be added into the search box 207. The user may use the "append summary" button 307 to review search results, and further direct the user's original search, by appending those results into the text to be queried. The topical map button 309 will be further discussed in relation to FIG. 26.

FIG. 25 shows the fisheye view output if the user selects to expand the topic with the click button 223, as shown in FIG. 24. In the example in FIG. 25, the user has selected to expand the topic corresponding to the document of rank 1. Expanding the topic displays the documents comprising the topic according to the document rank. Documents within the topic that do not strongly correlate with the natural language query are not included within the topic display. In this view, the user can review the short phrases 215 from each document and determine which phrase most strongly matches the user's natural language query 29, as shown in FIG. 24. Thus, kPOOL does not merely produce an indicator, comprising the short phrases 215, of the most relevant retrieved document that closely matches the search query. Rather, kPOOL additionally produces an indicator, comprising a short phrase 215, of an additional document, that is clustered together with the most relevant retrieved document, that may not closely match the search query. The document nodes of the most relevant retrieved document, and the other documents, were clustered together during a process of optimal agglomerative clustering 58, as discussed in relation to FIG. 5. The documents shown in FIG. 25, correspond to the document nodes that were combined, in the process of optimal agglomerative clustering 58. Thus, kPOOL not only retrieves relevant documents that closely match the search query, but also displays other documents that have been combined with the relevant documents.

FIG. 25 additionally illustrates a window 224 that displays the text of the document associated with the button 225. If a user clicks the button 225, an expanded view of the document text is produced. The portion of the document text shown as a short phrase 215 in the retrieved documents output 205 is highlighted in the window 224.

The fisheye view illustrated in FIGS. 24-25 allows a user to quickly refine a search and retrieve relevant documents. Upon an initial query in the search box 207, a user is shown the topics that are relevant to the search. A user can quickly determine which topic most clearly corresponds to the search query. Thus, even if the search query does not directly address the user's true intent, the user can quickly assess other topics that may be more relevant. Upon expanding 223 the topic, the user can see other documents within the same topic that may be more relevant. The user can then select 307 documents that clarify the user's idea before repeating the search. This process of search-then-clarify is how kPOOL enables cognitive acceleration on the part of the user. With each search, kPOOL's topics direct and develop the user's understanding until the query correctly expresses the user's idea.

The fisheye view 33 represents an exemplary output from a natural language query. kPOOL may also utilize any other output to display retrieved topics, and documents, including, but not limited to: a spreadsheet output, a listing of hyperlinks, or a system integrated within a domain corpus. The output may be provided in any manner for a user to perceive the information conveyed by kPOOL. In addition, the particular options and links shown in FIGS. 24-25 may be varied or customized by a designer or the user. The formatting and layout of the fisheye view 33 shown in FIG. 24-25 may also be varied or customized by a designer or the user.

Figure 26:
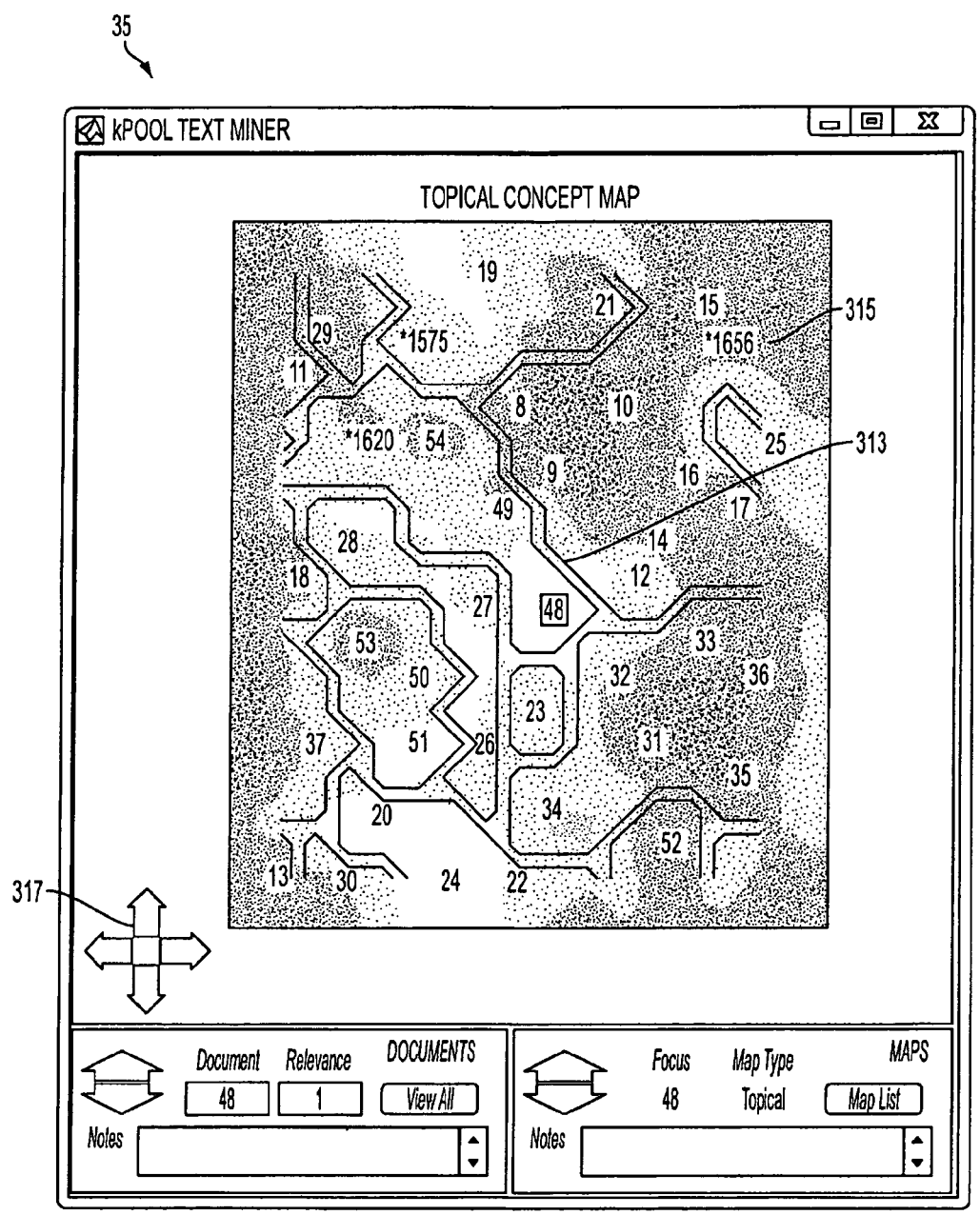
FIG. 26 is an illustration of a two-dimensional topical concept map.

FIG. 26 represents a two-dimensional topical concept map 35 produced if the user chooses to form 227 a topical concept map in the fisheye view 33, as shown in FIG. 24. Alternatively, kPOOL may display the two-dimensional topical concept map 35 directly, without the link from the fisheye view 33. The two-dimensional topical concept map 35 shown in FIG. 26 is a form of self-organizing map, as described in *Self-Organizing Maps* by Teuvo Kohonen. The self-organizing map represents a two-dimensional spatial map that shows the relationship between various documents. The numbers on the two-dimensional map correspond to the document rank displayed in the fisheye view 33 shown in FIG. 24. The numbers are indicators that indicate the documents from the fisheye view 33.

Figure 27:
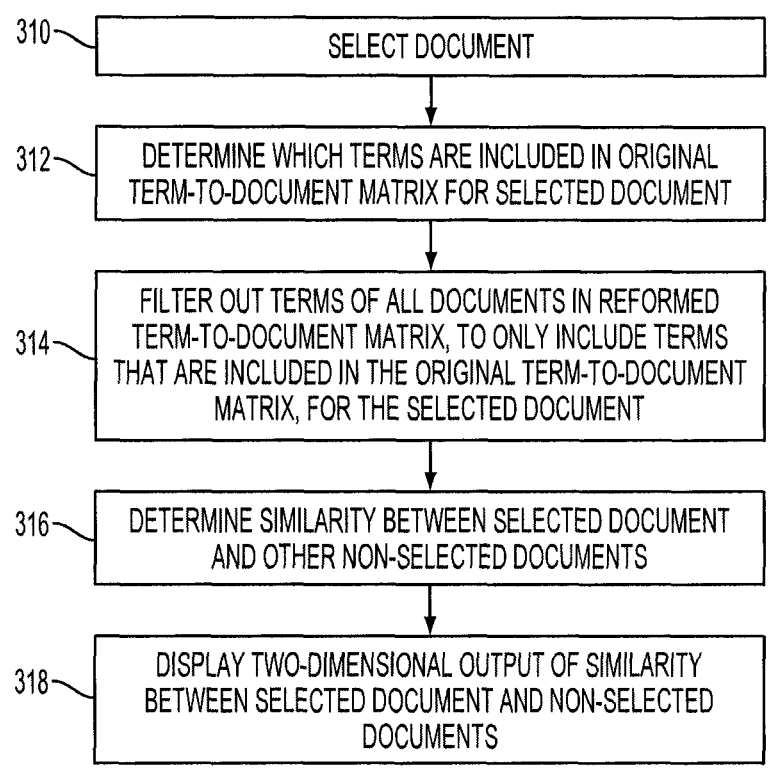
FIG. 27 is an illustration of a flowchart representing a process of forming a two-dimensional topical concept map.

The self-organizing map is formed, in part, in the manner shown in FIG. 27. FIG. 27 is a flowchart representing a method of formulating the exemplary topical concept map 35 shown in FIG. 26. In step 310, a document, or document node, is selected. The document, or document node, may be selected from, for example, the reformed term-to-document matrix 23, as shown in FIG. 8, or equivalently from the term-to-document matrix 18 shown in FIG. 7. Selecting the document, or document node from the reformed term-to-document matrix 23 merely indicates a particular document node is chosen to filter other terms of non-selected documents. For example, as shown in FIG. 26, the selected document may comprise document 48, shown with a box surrounding it. Once the document is selected, the terms contained within the document in the original term-to-document matrix 18, as shown in FIG. 7, are examined. In other words, the document node in the term-to-document matrix 18, which corresponds to the selected document node in the reformed term-to-document matrix 23, is examined.

In step 312, the entries in the term-to-document matrix 18 with non-zero values are determined. For example, for the term-to-document matrix 18 shown in FIG. 7, Document 3 includes a non-zero value of (X 3,1) for Term 1. The non-zero values for the selected document are determined and recorded in a database. Then, in step 314, a filtering process strikes out, or sets to zero, the terms in the reformed term-to-document matrix 23, shown for example in FIG. 8, that were not present in the original term-to-document matrix 18, for that selected document. For example, if Document 3 shown in FIG. 7 is selected, then the only non-zero entry is Term 1. Continuing the example, and referring now to the reformed term-to-document matrix 23 shown in FIG. 8, all the values shown for Term 2 through Term j, for all documents, are set to zero. The only entries remaining are the values (Z 1,1) through (Z 1, i). If Document 3 were to contain more non-zero entries, then the number of filtered, or masked entries in the reformed term-to-document matrix 23 would be reduced. The filtering step 314 may occur for as many or as few terms as desired. Thus, in other words, the terms of other document nodes in the reformed term-to-document matrix 23, for the document nodes that were not selected, are filtered based on the term that defines a document node in the term-to-document matrix 18, that corresponds to the document node that has been selected. The filtering process removes all terms from non-selected document nodes in the reformed term-to-document matrix 23, that do not correspond to terms that were present in the term-to-document matrix 18, for the selected document node. The terms from non-selected document nodes in the reformed term-to-document matrix 23, that do not correspond to terms that were present in the term-to-document matrix 18, are excluded.

In step 316, the similarities between the filtered selected document, or document node that has been selected, and the filtered non-selected documents, or document nodes that have not been selected, are measured. A cosine similarity may be used to determine the similarity between the documents. In step 318, kPOOL displays a two-dimensional output of the similarity between selected documents and non-selected documents. FIG. 26 illustrates the two-dimensional map, referred to as the topical concept map 35, that illustrates the correlation between a selected document and other non-selected documents. In FIG. 26, document 48 is represented as the selected document. The similarity between documents is represented by the lightness of the topical concept map 35. Areas that are more light are more similar to the selected document, and areas that are more dark are less similar to the selected document. A user may quickly perceive semantic relationships between documents based on the shading similarities In the formation of the topical concept map 35, kPOOL utilizes information regarding the topic membership of the documents. The formation of the topical concept map 35 is supervised with the topic membership, and forms topic groupings of the documents that are defined by a boundary 313. The boundary 313 may define the topic membership of the documents. Additional features of the topical concept map 35 include the documents 315 that are not produced on the topical concept map 35. These documents 315 are represented with a star, and are documents that ranked so low in comparison to the selected document that they are not reproduced on the topical concept map 35. Further features of the topical concept map 35 include navigation arrows 317 that allow a user to navigate across the map 35, and view the landscape of the map 34 that is not positioned locally to the selected document. In addition, the topical concept map 35 may contain hyperlinks to the domain corpus and allow the user to directly access the domain corpus. A user may simply click on the document number and directly view the document in the domain corpus.

The topical concept map 35 is used to illustrate the semantic relationships between the terms contained in documents. The documents utilized in the topical concept map 35 are not limited to those contained within the same cluster or topic as the selected document. Rather, documents from an entire hierarchy of clustered documents 11, as shown in FIG. 21, may be used to form the topical concept map 35. Thus, a user may quickly view semantic connections between words contained within documents, within a hierarchy of clustered documents.

Figure 28:
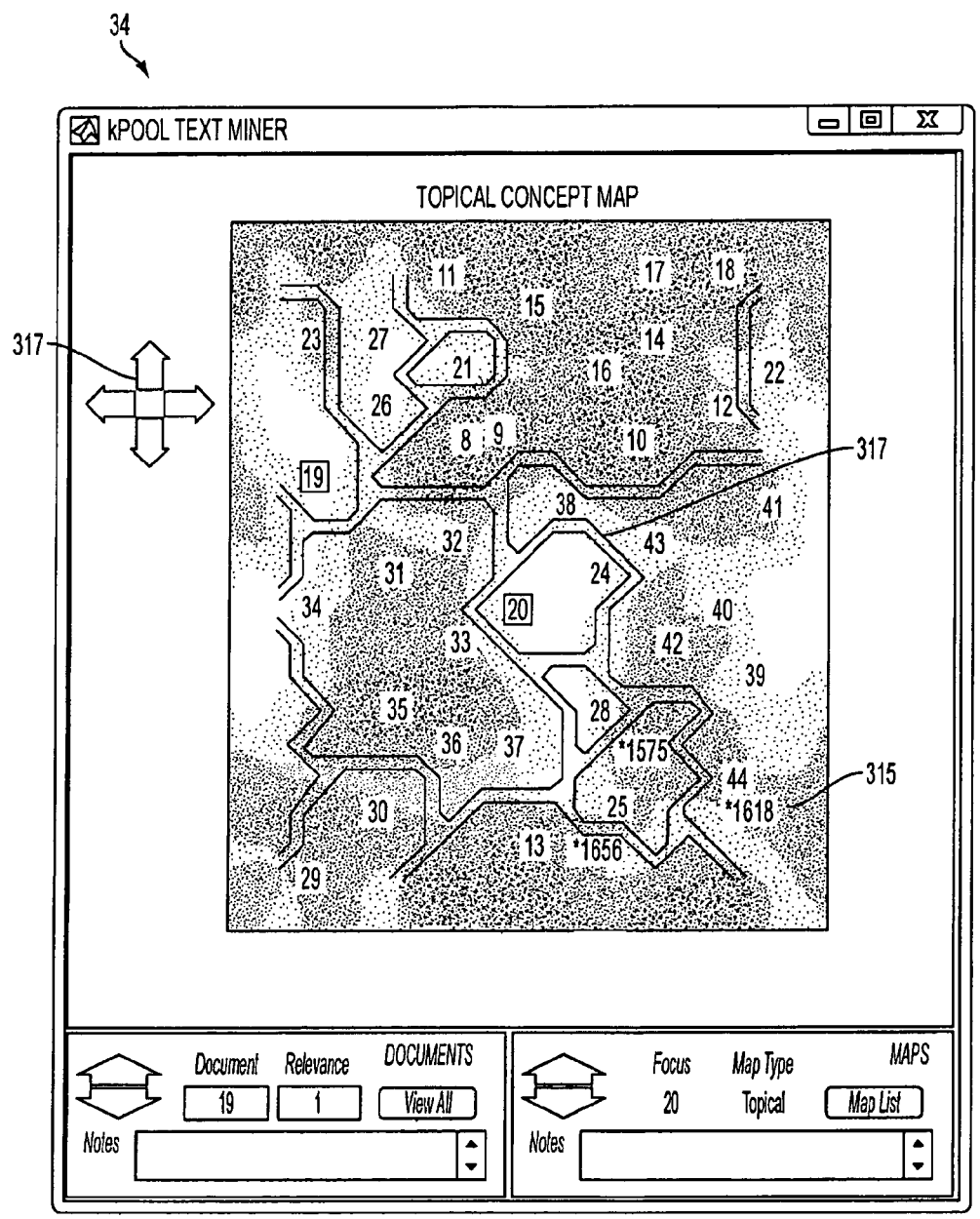
FIG. 28 is an illustration of a two-dimensional topical concept map.

The semantic connections displayed in the topical concept map 35, between words, is further demonstrated by FIG. 28. FIG. 28 illustrates a topical concept map 34, including documents taken from the same domain corpus as the map 35 shown in FIG. 26. However, in FIG. 28, document 20 is selected as the selected document for which the process shown in FIG. 27 occurs. Thus, different terms are filtered in step 314 of FIG. 27. Accordingly, a different topical concept map 34 is formed in FIG. 28, than shown in FIG. 26. For example, note that document 20 is shown in FIG. 26 as being related to document 48. However, also note that document 48 is not visible in FIG. 28, when document 20 is selected as the focus document. The disappearance of document 48, from the topical concept map 34 shown in FIG. 28, is explained by the different terms that are masked, or filtered, in step 314 shown in FIG. 27.

The different documents shown in FIGS. 26 and 28 represent different semantic relationships between the terms used in the documents. For example, the relationship for a term used in document 48, shown in FIG. 26, may correspond to the term used in document 20, in a different manner than the terms used in document 20 relate to document 48. The relationships between the terms in documents 48 and 20 may not be symmetrical. For example, the term "class," has a directional relationship with the term "student," that is a different relationship than the term "student," has with the term "class." The relationships between terms shown in the topical concept maps 35, 34 of FIGS. 26 and 28, allows a user to effectively "mine" texts and determine the semantic relationships between terms in documents.

Figure 29:
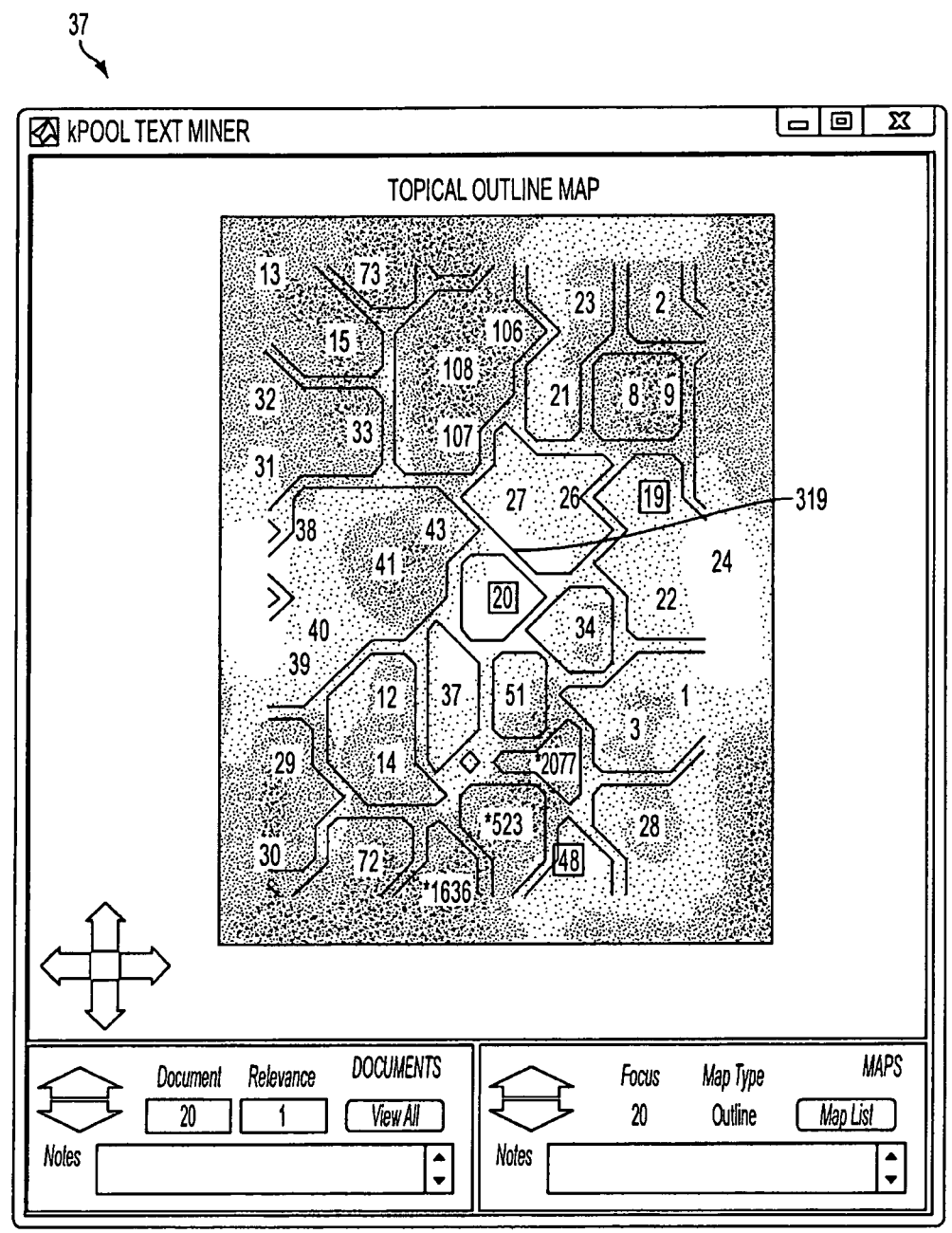
FIG. 29 is an illustration of a topical outline map.

FIG. 29 illustrates a "topical outline map" 37, which is produced using the steps shown in FIG. 27, yet utilizes documents across a wider domain corpus than the topical concept map 34. Multiple hierarchies may be utilized, and a search may span across multiple trees, or hierarchies of clustered documents. The boundaries 319 between the documents may represent the separation between larger groupings of documents. The larger groupings may represent clusters of documents that span across the hierarchy of clustered documents 11. The topical outline map 37 may then represent a larger corpus of documents from which semantic relationships may be determined. The documents may include hyperlinks to the domain corpus and allow the user to directly access the domain corpus related to a particular document. The numbers on the topical outline map 37 are indicators that indicate the documents from the fisheye view 33, shown in FIG. 24. In one embodiment, kPOOL may search for documents to display in the topical outline maps 37, by first searching for similar documents without using filtered terms. Then, when similar documents are determined, the terms of these similar documents may be filleted using the steps 310, 312, 314, 316, and 318 shown in FIG. 27.

In an alternative embodiment, a user may roll through the two-dimensional topical concept map 34, or topical outline map 37, by moving a mouse cursor to the edge of the map. The two-dimensional topical concept map 34, or topical outline map 37, will scroll and show more of the two-dimensional map. The user may then travel along the map and visualize the entire scope of the document relationship.

Figure 30A:
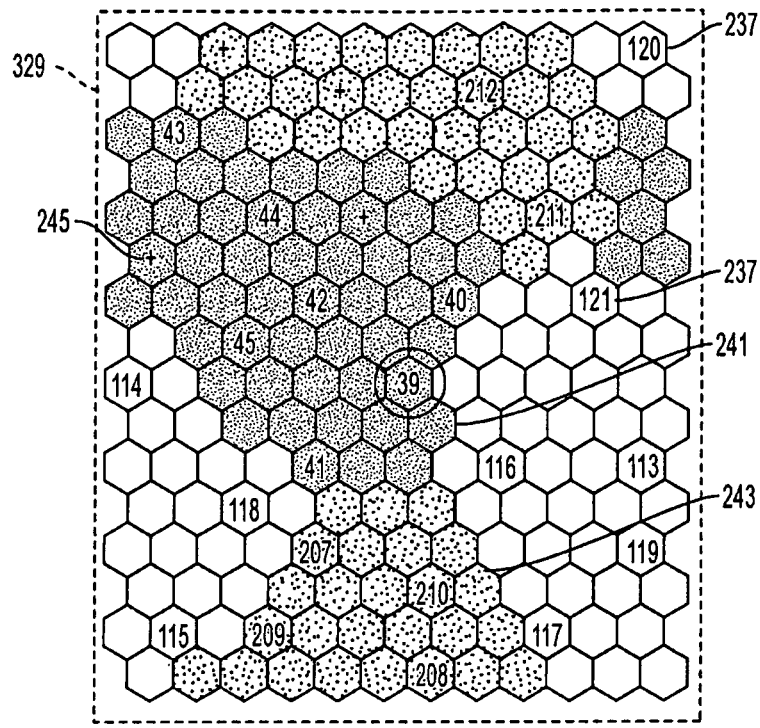
FIGS. 30a and 30b illustrate two-dimensional self-organizing maps.

In another embodiment, the user can navigate the two-dimensional topical map 34 by viewing a trail or marker indicating which documents the user has viewed. The user can then view a visual history of which documents the user has already accessed and be able to trace the document already viewed.

kPOOL may form additional types of self-organizing maps that contain information regarding the relationships between documents. In one embodiment, the filtering, or masking process shown in FIG. 27 may not be used to filter the terms contained in the documents. In this embodiment, a self-organizing map may be formed without the terms being filtered. FIG. 30*a* illustrates such a topic map 329, formed using all of the terms in the documents. The topic map 329 is trained by the individual document vectors in the reformed term-to-document matrix 23 shown in FIG. 1 and the grouping of documents are supervised with the fourth level 177 membership of the documents, to allow the relationships between the third level 175 topics to be displayed. The document vectors in the reformed term-to-document matrix 23, shown in FIG. 1, are reduced to a two dimensional "x" and "y" coordinates which the self-organizing map uses to map the relationships between the documents. The two-dimensional topic map 329 represents a spatial map that shows the relationship between various documents. The numbers 237 on the two-dimensional map correspond to the document rank displayed, for example, in the fisheye view 33. The distance between the numbers represent a degree of similarity between the documents, however, the documents are also grouped together by topic, thus, if a number 237 on the two-dimensional topic map 34 appears closer to another number 237, then it is likely more closely related to that number. If a number 237 appears further away on the spatial map from a number 237, then it is likely less related to that number than a closer number.

The shaded regions 241, 243 correspond to different topics. A user can quickly perceive the topics the documents are associated with. Thus, kPOOL does not merely produce an indicator, comprising the number 237, of the most relevant retrieved document that may match a search query. Rather, kPOOL additionally produces an indicator, comprising a number, of an additional document, that is clustered together with the most relevant retrieved document that matches the search query. The document nodes of the most relevant retrieved document, and the other documents, were clustered together during a process of optimal agglomerative clustering 58, as discussed in relation to FIG. 5. The documents within the same shaded regions 241, 243, shown in FIG. 30*a*, correspond to the document nodes that were combined, in the process of optimal agglomerative clustering 58. Thus, kPOOL not only retrieves and displays relevant documents on the self-organizing maps that match a search query, for example the search query 29 discussed in relation to FIG. 24, but also displays other documents that have been combined with the relevant documents.

Figure 30B:
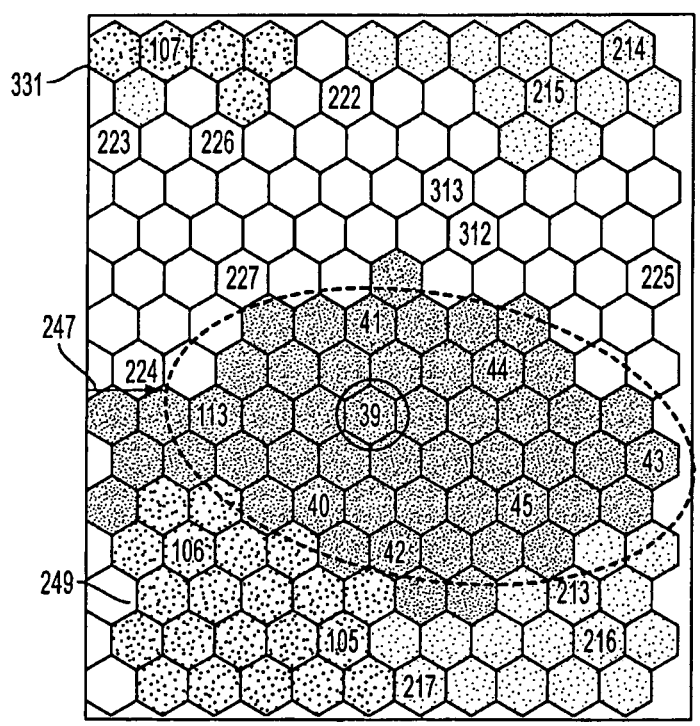

FIG. 30*b* displays the mapping of a two-dimensional topic map 329 to a two-dimensional map 331 that includes clusters higher along the tree structure, including the fifth level membership 179, as shown in FIG. 21. Similar to the topic map 329, the two-dimensional map 331 is a self-organizing map. The self organizing map is trained by the individual document vectors in the reformed term-to-document matrix 23 and is supervised with the fifth level 179 membership of the documents, as shown in FIG. 21. The document vectors in the reformed term-to-document matrix 23 are reduced to a two dimensional "x" and "y" coordinates which the self-organizing map uses to map the relationships between the documents. The shaded regions 247, 249 now correspond to the different fifth level clusters. In the example shown in FIG. 27, the document corresponding to document rank 39 has been visualized with the map 331. The shaded region 247 shows the other documents within the same fifth level clusters similar to document rank 39. Similar to the topic map 329, the distance between the numbers represents a form of similarity between the documents. A user can now visualize similar documents in multiple fifth level clusters.

In an alternative embodiment, kPOOL may create a two dimensional map trained with the membership of any level 171, 173, 175, 177, 179 within the hierarchy of clustered documents 11, as shown in FIGS. 1 and 21, or with any level of membership contemplated by the present invention.

Figure 31A:
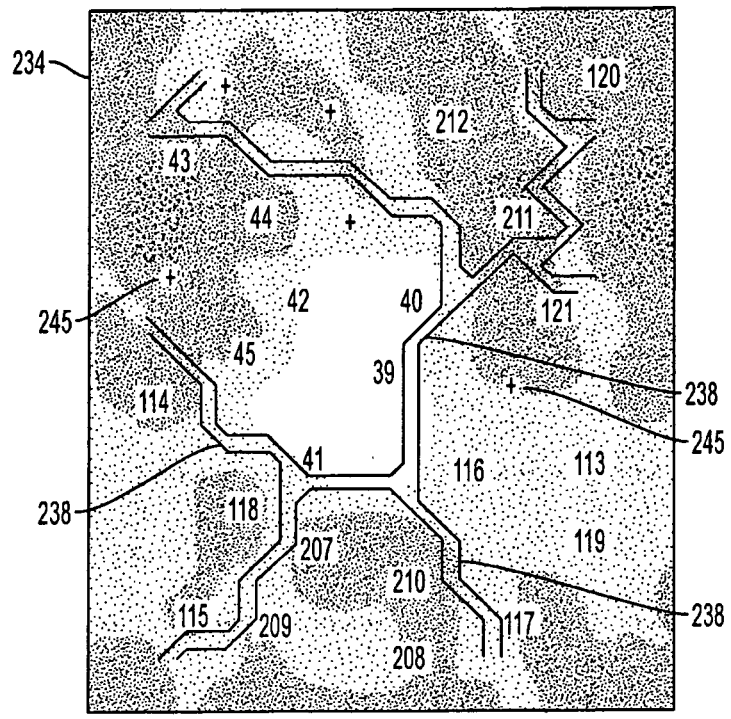
FIGS. 31a and 31b illustrate two-dimensional self-organizing maps.
Figure 31B:
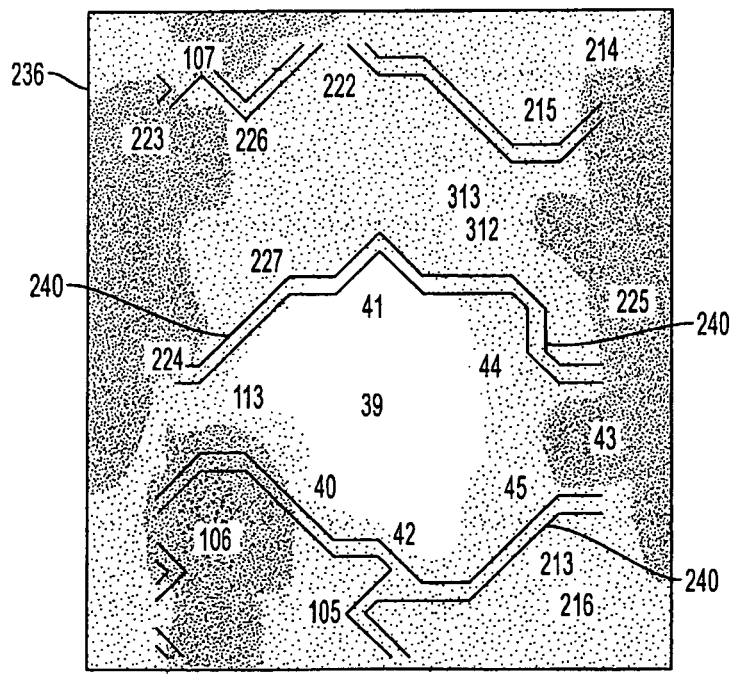

In another alternative embodiment, kPOOL forms a two-dimensional color gradient topic map 234 and a two-dimensional color gradient map 236 that includes clusters higher along the tree structure. FIGS. 31*a* and 31*b* represent the mapping of a color gradient topic map 234 to a color gradient map 236 that includes clusters higher along the tree structure. The color gradient topic map 234 includes a color gradient that identifies the documents that are most similar to a selected document. The lighter colors identify which documents are most similar to a selected document. The darker colors represent dissimilarity. The contour lines 238 separate topics from one another. The color gradient topic map 234 may therefore display a variance of similarity and dissimilarity between documents.

In the example shown in FIG. 31*a*, the user selects to form a color gradient topic map 234 corresponding to a selected document rank 39. The contour lines 238 distinguish the topic containing document rank 39 and also including document rank 40, 41, 42, 43, 44, and 45. The plus or "+" symbols 245 represent documents within the same topic that are not displayed because they do not strongly relate to document rank 39. From the exemplary map, a user can visually see that document ranks 40 and 116 are close in meaning to document rank 39 because they are both represented by lighter parts of the color gradient. Document rank 116 is close in meaning to document rank 39 because it is represented by lighter parts of the color gradient. Document rank 116 is close in meaning to document rank 39 even though it remains outside the contour lines 238, representing a different topic.

FIG. 31*b* also displays a color gradient map 236 mapped to the color gradient topic map 234. The contour lines 240 show the other documents within the same clustered hierarchy level 5 grouping. A user can now visualize similar documents across multiple high level clusters.

In yet another alternative embodiment, any of the embodiments of two-dimensional maps discussed throughout this application may represent a topographic map. A color gradient may correspond to an elevation within a topographic map.

The lighter colors may represent a low level of elevation and the darker colors may represent a higher level of elevation. Alternatively, lighter colors may represent a high level of elevation and the darker colors may represent a lower level of elevation. The topographic map may be represented as a three-dimensional model the user may examine to visualize differences between documents in any of methods or embodiments discussed throughout this application.

Further, in any embodiment of two-dimensional map, a user may roll through the map by moving a mouse cursor to the edge of the map. The two-dimensional map, will scroll and show more of the two-dimensional map. The user may then travel along the map and visualize the entire scope of the document relationship.

In another embodiment, the user can navigate any embodiment of two-dimensional map by viewing a trail or marker indicating which documents the user has viewed. The user can then view a visual history of which documents the user has already accessed and be able to trace the document already viewed.

Figure 32:
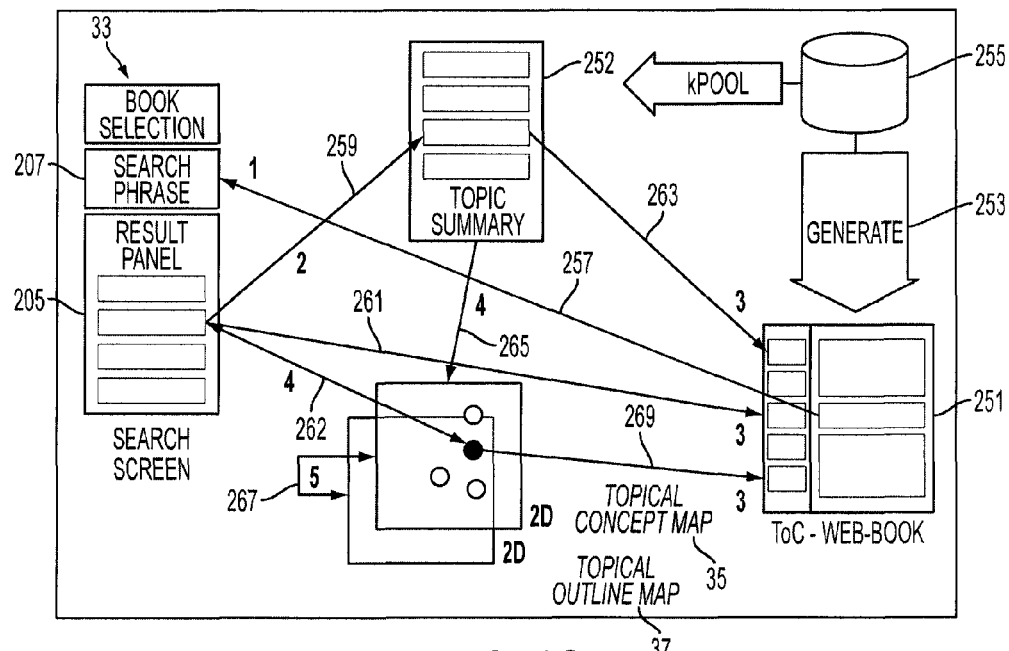
FIG. 32 is a simplified block diagram of an alternative embodiment of the present invention implementing a webbook.

FIG. 32 represents an alternative embodiment of the kPOOL invention. In this embodiment, kPOOL utilizes a web-book 251 generated 253 from a large set of documents 255. The large set of documents 255 comprises a domain corpus 13, as discussed in relation to FIG. 1. The large set of documents 255 may be a group of documents, such as an encyclopedia. The web-book 251 may include a table of contents providing a listing of the contents of the web-book 251. In addition, the web-book 251 may include a reader that allows a user to highlight text within the web-book 251 and directly link 257 to the search box 207 in the fisheye view. Moreover, the user may cut and paste directly from the web-book into the search box 207. The fisheye view 33 may link 261 back to material in the web-book 251 and highlight material in the web-book or a table of contents. The search results may be superimposed in the web-book reader. The fisheye view 33 produces an output 205 that may provide a link 259 to a highlighted summary of a topic's results in a topic summary 252 similar to the expanded topic view 205 shown in FIG. 25. The fisheye view may also link 262 to a topical concept map 35, as shown in FIG. 26. From the topic summary 252, the user may link 263 back to the web-book 251 and highlight the web-book or link 265 to the topical concept map 35. From the topical concept map 35, the user may link 269 back to the web-book 251, or may form 267 a topical outline map 37 as discussed in relation to FIG. 29. The utility of the web-book 251 and the various links is that a user can quickly navigate and search a web-book 251. A user may highlight text in the web-book 251 and quickly find other relevant material in the same web-book 251. The user may directly link 261 back to the web-book from the fisheye view 33 or search through the topical concept map 35 for related documents. The searches may be stored by kPOOL for reuse in future searches. The user may navigate through the same web-book 251 or may also search through another set of documents 255 in a different domain corpus.

Figure 33:
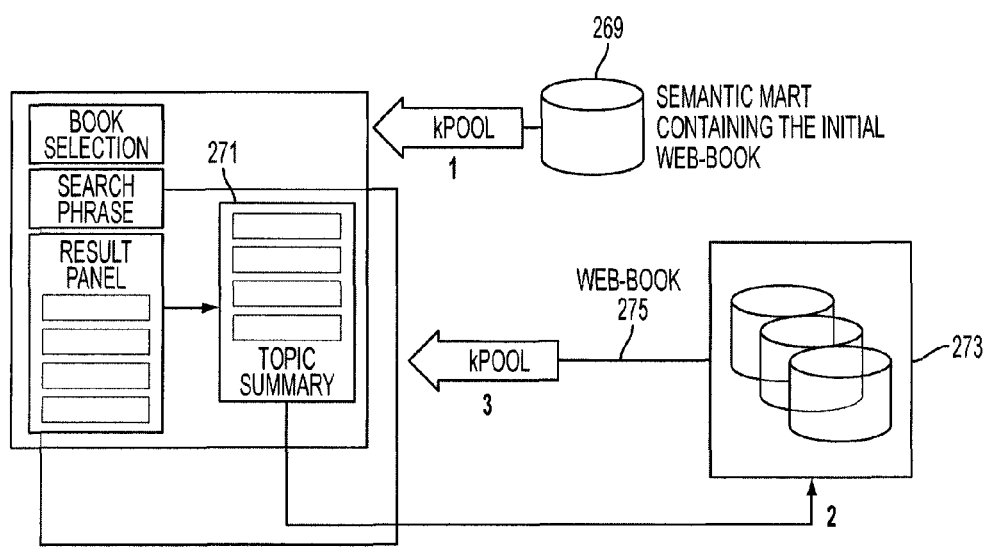
FIG. 33 is a simplified block diagram of an alternative embodiment of the present invention implementing a federated semantic mart.

FIG. 33 represents an alternative embodiment of the kPOOL invention including a federated semantic mart. The federated semantic mart is a method of searching across multiple collections of documents. kPOOL parses a semantic mart 269. The semantic mart 269 is equivalent to a domain corpus 13, as shown in FIG. 1. kPOOL may create a web-book 251 from the semantic mart 269 as discussed in relation to FIG. 32. Then, the user may find a relevant topic 271 through kPOOL's standard natural language query, as discussed in relation to FIG. 24. kPOOL uses the relevant topic 271 and determines the relevant documents within that topic.

kPOOL then searches a mart of other web-books 273 using the documents within that topic. kPOOL retrieves web-books 275 from the mart of other web-books 273 that relate to the retrieved topic documents. kPOOL then searches the retrieved web-books 275 using the original natural language query. The search may expand by using crawling federated marts that crawl through the mart of other web-books 273 and search with the natural language query. In addition, kPOOL may maintain statistics to correlate web-books with a user's search pattern to accelerate future searches.

Figure 34:
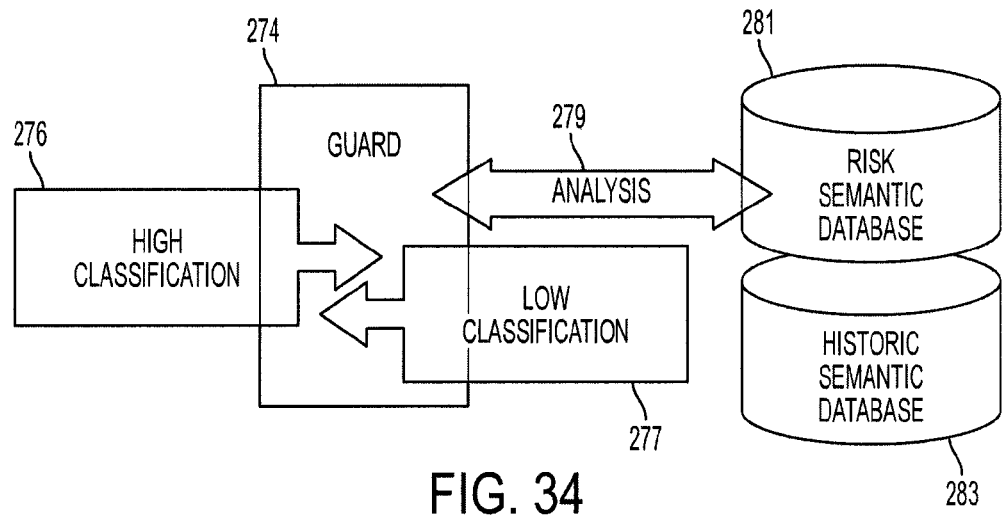
FIG. 34 is a simplified block diagram of an alternative embodiment of the present invention implementing a cross-domain solution.

FIG. 34 represents an alternative embodiment of the kPOOL invention used in a cross-domain solution implementation. In this embodiment, a guard 274 controls the passage of information packets from two disparate domains 276, 277. The guard 274 comprises a series of rules used to validate or deny passage of information between the two disparate domains 276, 277. kPOOL performs analysis 279 on the packets the guard has allowed and not allowed. The packets represent the domain corpus 13, as discussed in relation to FIG. 1. kPOOL's analysis 279 assesses the packet's content and generates a symbol-to-sample matrix analogous to the term-to-document matrix 18. kPOOL builds two databases 281, 283 from the symbol to sample matrix. The risk semantic database 281 consists of a mixture of valid and invalid information packets. The risk semantic database 281 is used to identify packets that may violate transfer rules. The historic semantic database 283 contains all the packets that have been moved over a particular window in time. The historic semantic database is used to identify evolving transfer patterns between the domains 276, 277. A hierarchy of clustered documents, similar to the hierarchy 11 discussed in relation to FIG. 1, of the symbol to sample matrix is created in the standard kPOOL method of optimal agglomerative clustering and are stored in the databases 281, 283. Topical concept maps and outline maps may also be formed.

kPOOL may correlate a transferred packet with the risk semantic database 283 and the historic semantic database 283 in a similar fashion to querying a document matrix. However, in this embodiment, the packet is queried against the history of packets passed through the guard 274. Thus, kPOOL may assess the risk level of a transferred packet. kPOOL may provide a warning for a strong correlation between a transferred packet and packets that may violate transfer rules. In addition, kPOOL may perform the risk assessment in a real time analysis by tracking a stream of packets across a two dimensional packet map.

Figure 35:
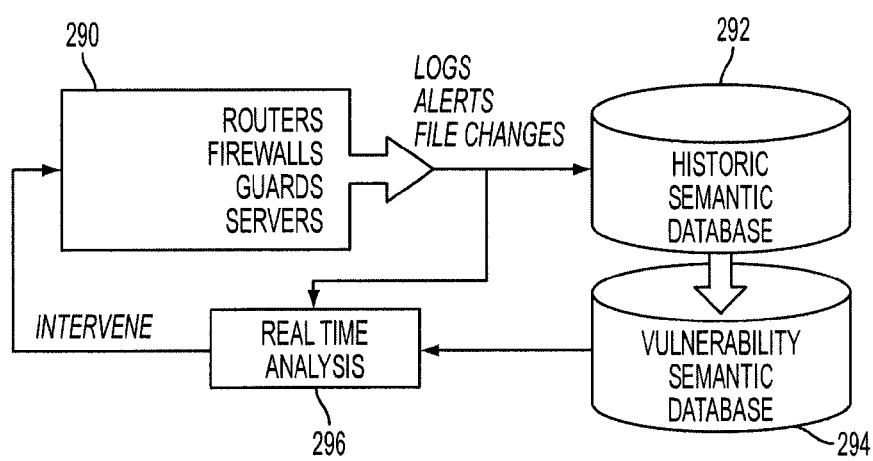
FIG. 35 is a simplified block diagram of an alternative embodiment of the present invention implementing a security event manager.

FIG. 35 represents an alternative embodiment of the kPOOL invention used as a security event manager. The security event manager 290 represents a series of routers, firewalls, guards, and servers. kPOOL collects a series of logs, alerts, and file changes from the security event manager 290 and creates a symbol-to-sample matrix representing those events. The information from the security event manager 290 represents the domain corpus 13, as discussed in relation to FIG. 1. kPOOL creates two databases 292, 294 from the logs, alerts, and file changes. The first is a historic semantic database 292. The historic semantic database 292 collects the history of attack patterns on the security event manager 290 and identifies evolving attack patterns. The second database is a vulnerability semantic database 294. Topical concept maps and topical outline maps, and a hierarchy of clustered documents, of the symbol-to-sample matrix are created in the standard kPOOL method of optimal agglomerative clustering and are stored in the databases 292, 294.

kPOOL may correlate an event with the historic semantic database 292 and the vulnerability semantic database 294 in a similar fashion to querying a document matrix. However, in this embodiment, the packet is queried against the history of events detected by the security event manager 290. kPOOL may perform a real time query of the databases 292, 294 and assess the risk level of a perceived attack. kPOOL may intervene and alert the security event manager 290. In addition, kPOOL may perform the threat assessment by tracking a stream of packets across a two dimensional map, similar to the two-dimensional maps discussed throughout this application. The two-dimensional map may represent a vulnerability map.

Figure 36:
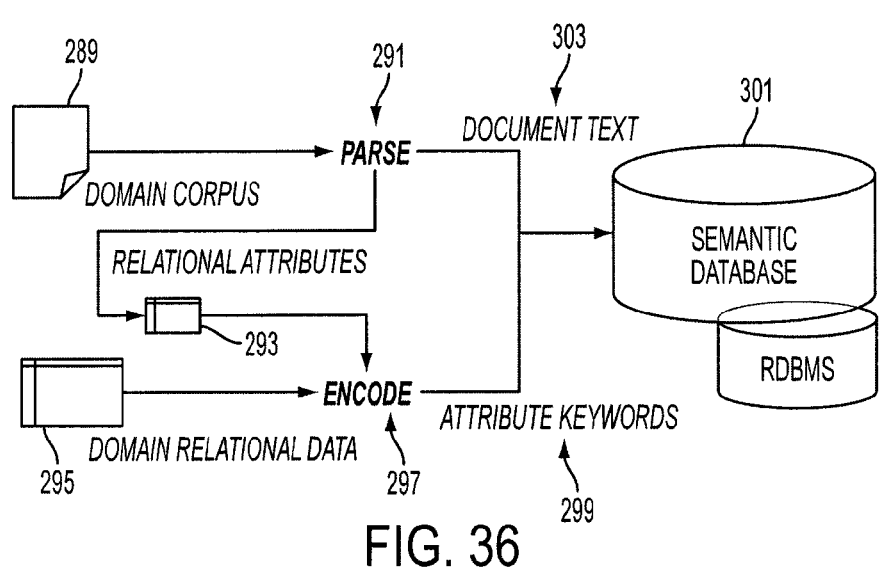
FIG. 36 is a simplified block diagram of an alternative embodiment of the present invention used in intelligence mining.

FIG. 36 represents an alternative embodiment of the kPOOL invention used for intelligence mining in commercial, military, and criminal domains, where kPOOL appends a series of relational data to the term to document matrix. In the alternative embodiment, a domain corpus 289 is parsed 291 into a series of relational attributes 293 and standard document text 303. The relational attributes may be a classification such as an individual's height or age. A domain relational data set 295 contains a series of attribute keywords 299 that are encoded 297 into the relational attributes 293. The attribute keywords 299 are appended to the term-to-document matrix. A user can then perform a standard kPOOL natural language query across the document text 303 and the appended attribute keywords 299.

As an example, the domain corpus 289 may be a police report with a description of an offender. kPOOL parses 291 the police report into relational attributes 293, which may be characteristics such as the offender's height. The domain relational data 295 may be a defined range of height that corresponds to a certain classification. Thus, the relational attribute 293 of a certain height may be encoded 297 as "tall," "average," or "short." The classification is appended to the police report document text 303 and is inputted to the semantic database 301. Thus, the user may search the database 301 with a natural language query that semantically searches the original corpus, a natural language query that includes the attribute keywords, or a SQL phrase to filter the retrieved documents. A user may then input an attribute keyword such as "short," in a natural language query and retrieve relevant documents. In addition, the user may search through the hierarchy of clustered documents related to the attribute keyword to determine other relevant information. Thus, a user could search for a certain height keyword 299, and retrieve a criminal modus operandi associated with that height. The approach could be applicable to any type of intelligence mining. The relational attributes 293 may be any term capable of classification.

The various illustrative logical blocks, units, and modules described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In one embodiment, the present invention may be utilized using Java, and may be implemented as a Java Applet.

The steps of a method or algorithm described in connection with the examples disclosed herein may be embodied directly in hardware, in a software module executed by a processor, or in a combination of the two. Furthermore the method and/or algorithm need not be performed in the exact order described, but instead may be varied. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem. In addition, the present invention may be implemented as a machine readable medium. The machine may be a computer. The present invention may be stored as instructions that when executed by a processor cause the present invention to be effected. The medium may be a tangible, non-transitory computer readable medium, or a computer readable storage medium, or combinations thereof.

The previous description of the disclosed examples is provided to enable any person of ordinary skill in the art to make or use the disclosed methods and system. Various modifications to these examples will be readily apparent to those skilled in the art, and the principles defined herein may be applied to other examples without departing from the spirit or scope of the disclosed method and system. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A computer-based method of organizing data for search, the method comprising the steps of:
accessing a domain corpus;
parsing the domain corpus into a plurality of documents;
parsing each document into at least one term that corresponds to the document;
generating a term-to-document matrix that correlates each document with the at least one term that corresponds to the document, the at least one term defining a document node for the document;
performing a singular value decomposition and a dimension reduction on the term-to-document matrix to form a reformed term-to-document matrix having document nodes with fewer dimensions than the document nodes of the term-to-document matrix;
comparing at least one document node of the reformed term-to-document matrix against another document node of the reformed term-to-document matrix; and
combining at least one document node of the term-to-document matrix with another document node of the term-to-document matrix, based on the comparison of the at least one document node of the reformed tem-to-document matrix against the another document node of the reformed term-to-document matrix, to form a combined document node representing the combination of the at least one document node of the term-to-document matrix with the another document node of the term-to-document matrix, thereby clustering at least two document nodes of the term-to-document matrix.

2. The computer-based method of claim 1, wherein the step of comparing the at least one document node of the reformed term-to-document matrix against the another document node of the reformed term-to-document matrix, includes determining the cosine similarity between the at least one document node of the reformed term-to-document matrix and the another document node of the reformed tem-to-document matrix, 3. The computer-based method of claim 1, wherein the step of combining the at least one document node of the tem-to-document matrix with the another document node of the term-to-document matrix to form a combined document node representing the combination of the at least one document node of the term-to-document matrix with the another document node of the term-to-document matrix, includes summing the at least one document node of the term-to-document matrix with the another document node of the term-to-document matrix, 4. The computer-based method of claim 1, wherein:
the at least one document node of the term-to-document matrix that is combined with the another document node of the term-to-docuinent matrix, represents a document parsed from the domain corpus, that is represented by the at least one document node of the reformed term-to-document matrix that is compared against the another document node of the reformed term-to-document matrix, and
the another document node of the term-to-document matrix, represents a document parsed from the domain corpus, that is represented by the another document node of the reformed term-to-document matrix.

5. The computer-based method of claim 1, wherein the step of comparing the at least one document node of the reformed term-to-document matrix against the another document node of the reformed term-to-document matrix, includes determining if a similarity measure between the at least one document node of the reformed term-to-document matrix and the another document node of the reformed term-to-document matrix exceeds a threshold value.

6. The computer-based method of claim 5, wherein the step of combining the at least one document node of the term-to-document matrix with the another document node of the term-to-document matrix, includes combining the at least one document node of the term-to-document matrix with the another document node of the term-to-document matrix, based on whether the similarity measure between the at least one document node of the reformed term-to-document matrix and the another document node of the reformed term-to-document matrix exceeds the threshold value.

7. The computer-based method of claim 1, wherein the steps of
comparing at least one document node of the reformed term-to-document matrix against another document node of the reformed term-to-document matrix; and
combining at least one document node of the term-to-document matrix with another document node of the term-to-document matrix, based on the comparison of the at least one document node of the reformed term-to-document matrix against the another document node of the reformed term-to-document matrix, to form a combined document node representing the combination of the at least one document node of the term-to-document matrix with the another document node of the term-to-document matrix, thereby clustering at least two document nodes of the term-to-document matrix,
are performed iteratively until each document node of the term-to-document matrix is combined with at least one other document node of the term-to-document matrix, thereby forming a combined term-to-document matrix.

8. The computer-based method of claim 7, further comprising querying the document nodes of the reformed term-to-document matrix to produce a retrieved document, and displaying on a graphical user interface, both an indicator of the retrieved document and an indicator of at least one other document that corresponds to a document node that is combined with a document node that corresponds to the retrieved document.

9. The computer-based method of claim 7, further comprising querying the document nodes of the reformed term-to-document matrix to produce a retrieved document, and displaying on a self-organizing map, both an indicator of the retrieved document and an indicator of at least one other document that corresponds to a document node that is combined with a document node that corresponds to the retrieved document.

10. The computer-based method of claim 1, wherein the step of parsing each document into the at least one term that corresponds to the document, includes tagging the at least one term with a part-of-speech.

11. The computer-based method of claim 1, wherein the domain corpus is selected from a group consisting of: textual material, symbols, machine-readable data, and combinations thereof.

12. The computer-based method of claim 1, wherein the at least one document node of the term-to-document matrix is combined with the another document node of the term-to-document matrix based on a steepest descent algorithm applied to the at least one document node of the reformed term-to-document matrix and the another document node of the reformed term-to-document matrix.

13. A non-transitory computer readable medium storing instructions that when executed by a processor, cause the processor to:
access a domain corpus;
parse the domain corpus into a plurality of documents;
parse each document into at least one term that corresponds to the document;
generate a term-to-document matrix that correlates each document with the at least one term that corresponds to the document, the at least one term defining a document node for the document;
perform singular value decomposition and a dimension reduction on the term-to-document matrix to form a reformed term-to-document matrix having document nodes with fewer dimensions than the document nodes of the term-to-document matrix;
compare at least one document node of the reformed term-to-document matrix against another document node of the reformed term-to-document matrix; and
combine at least one document node of the term-to-document matrix with another document node of the term-to-document matrix, based on the comparison of the at least one document node of the reformed term-to-document matrix against the another document node of the reformed term-to-document matrix, to form a combined document node representing the combination of the at least one document node of the term-to-document matrix with the another document node of the term-to-document matrix, thereby clustering at least two document nodes of the term-to-document matrix.

14. The computer readable medium of claim 13, wherein the instruction of combine the at least one document node of the term-to-document matrix with the another document node of the term-to-document matrix to form a combined document node representing the combination of the at least one document node of the term-to-document matrix with the another document node of the term-to-document matrix, includes summing the at least one document node of the term-to-document matrix with the another document node of the term-to-document matrix.

15. The computer readable medium of claim 13, wherein:
the at least one document node of the term-to-document matrix that is combined with the another document node of the term-to-document matrix, represents a document parsed from the domain corpus, that is represented by the at least one document node of the reformed term-to document matrix that is compared against the another document node of the reformed term-to-document matrix, and
the another document node of the tem-to-document matrix, represents a document parsed from the domain corpus, that is represented by the another document node of the reformed term-to-document matrix.

16. The computer readable medium of claim 13, wherein the instruction of compare the at least one document node of the reformed term-to-document matrix against the another document node of the reformed term-to-document matrix, includes determining if a similarity measure between the at least one document node of the reformed term-to-document matrix and the another document node of the reformed term-to-document matrix exceeds a threshold value.

17. A computer-based method of ascertaining semantic relationships between documents, the method comprising the steps of:
accessing a domain corpus;
parsing the domain corpus into a plurality of documents;
parsing each document into at least one term that corresponds to the document;
generating a term-to-document matrix that correlates each document with the at least one term that corresponds to the document, the at least one term defining a document node for the document;
performing a singular value decomposition and a dimension reduction on the term-to-document matrix to froma reformed term-to-document matrix having document nodes with fewer dimensions than the document nodes of the term-to-document matrix;
selecting a document node of the reformed term-to-document matrix;
filtering terms of at least one document node of the reformed term-to/-document matrix that is not the selected document node, based on which at least one term defines a document node in the term-to-docuinent matrix that corresponds to the document node that has been selected, to form at least one filtered document node that has not been selected; and
displaying an output of a similarity between the document node that has been selected, and the at least one filtered document node that has not been selected, thereby displaying a semantic relationship between the document node that has been selected and the at least one filtered document node that has not been selected.

18. The computer-based method of claim 17, wherein the step of filtering terms of at least one document node of the reformed term-to-document matrix that is not the selected document node, includes excluding terms from the at least one document node of the reformed term-to-document matrix that is not the selected document node, that do not correspond to the at least one term that defines the document node in the term-to-document matrix that corresponds to the document node that has been selected.

19. The computer-based method of claim 17, wherein the output is displayed on a two-dimensional map.

20. The computer-based method of claim 19, wherein the two-dimensional map is a self-organizing map.

21. A non-transitory computer readable medium storing instructions that when executed by a processor, cause the processor to:
access a domain corpus;
parse the domain corpus into a plurality of documents;
parse each document into at least one term that corresponds to the document;
generate a term-to-document matrix that correlates each document with the at least one term that corresponds to the document, the at least one term defining a document node for the document;
perform a singular value decomposition and a dimension reduction on the term-to-document matrix to form a reformed term-to-document matrix having document nodes with fewer dimensions than the document nodes of the term-to-document matrix;
select a document node of the reformed term-to-document matrix;
filter terms of at least one document node of the reformed term-to-document matrix that is not the selected document node, based on which at least one term defines a document node in the term-to-document matrix that corresponds to the document node that has been selected, to form at least one filtered document node that has not been selected; and
display an output of a similarity between the document node that has been selected, and the at least one filtered document node that has not been selected, thereby displaying a semantic relationship between the document node that has been selected and the at least one filtered document node that has not been selected.

22. The non-transitory computer readable medium of claim 21, wherein the instruction of filter terms of at least one document node of the reformed term-to-document matrix that is not the selected document node, includes excluding terms from the at least one document node of the reformed term-to-document matrix that is not the selected document node, that do not correspond to the at least one term that defines the document node in the term-to-document matrix that corresponds to the document node that has been selected.

23. The computer based method of claim 1, further comprising:
combining a plurality of the document nodes of the term-to-document matrix to form a plurality of combined document nodes, each combined document node representing a combination of at least one document node of the term-to-document matrix with another document node of the term-to-document matrix and being formed based on a comparison of the at least one document node of the combined document node with the another document node of the combined document node, the plurality of combined document nodes forming a combined term-to-document matrix; and
performing a singular value decomposition and a dimension reduction on the combined term-to-document matrix to form a reformed combined term-to-document matrix having document nodes with fewer dimensions than the document nodes of the combined term-to-document matrix.

* * * * *